United States Patent
Uenaka

(10) Patent No.: US 7,495,693 B2
(45) Date of Patent: *Feb. 24, 2009

(54) ANTI-SHAKE APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 760 days.

This patent is subject to a terminal disclaimer.

(21) Appl. No.: 11/071,234

(22) Filed: Mar. 4, 2005

(65) Prior Publication Data

US 2005/0195287 A1 Sep. 8, 2005

(30) Foreign Application Priority Data

Mar. 8, 2004 (JP) ............................ P2004-063951

(51) Int. Cl.
*H04N 5/228* (2006.01)

(52) U.S. Cl. ............................ 348/208.99; 348/208.11; 348/208.4; 348/208.5; 348/208.13; 359/554; 359/555; 359/556; 359/557

(58) Field of Classification Search ............ 348/208.11, 348/208.99, 52, 55, 208.08, 208.4, 208.5, 348/208.13; 359/554–557

See application file for complete search history.

(56) References Cited

U.S. PATENT DOCUMENTS

| | | | | | |
|---|---|---|---|---|---|
| 5,266,988 | A | * | 11/1993 | Washisu | 396/55 |
| 5,479,236 | A | * | 12/1995 | Tanaka | 396/55 |
| 5,932,984 | A | * | 8/1999 | Murakami et al. | 318/560 |
| 5,974,269 | A | | 10/1999 | Sato et al. | |
| 6,108,118 | A | * | 8/2000 | Minamoto | 359/224 |
| 6,112,028 | A | * | 8/2000 | Okada | 396/55 |
| 6,603,927 | B2 | * | 8/2003 | Enomoto | 396/55 |
| 6,631,042 | B2 | * | 10/2003 | Noguchi | 359/823 |
| 6,985,176 | B2 | * | 1/2006 | Noguchi | 348/208.11 |
| 2003/0067544 | A1 | | 4/2003 | Wada | |

FOREIGN PATENT DOCUMENTS

| | | |
|---|---|---|
| JP | 10-142647 | 5/1998 |
| JP | 2002-229090 | 8/2002 |
| JP | 2003-110919 | 4/2003 |

OTHER PUBLICATIONS

U.S. Appl. No. 11/044,055 to Uenaka et al., filed Jan. 28, 2005.

(Continued)

*Primary Examiner*—David L Ometz
*Assistant Examiner*—Quang V Le
(74) *Attorney, Agent, or Firm*—Greenblum & Bernstein, P.L.C.

(57) ABSTRACT

An anti-shake-apparatus comprises a movable-unit, a fixed-unit, a signal-processor, and a controller. The movable-unit has an imaging-device and is movable in first-and second-directions. The fixed-unit has a hall-element-unit. The controller controls the movable-unit, the fixed-unit, and the signal-processor, and has first- and second-A/D-converters. The hall-element-unit has first and second horizontal-hall-elements for detecting a first-location, and first and second vertical-hall-elements for detecting a second-location. The movable-unit has a magnetic-field-generating unit having a coil for detecting the first- and second-locations. The signal-processor outputs a first-signal, specifying the first-location from the horizontal-hall-elements, to the first-A/D-converter, and a second-signal, specifying the second-location from the vertical-hall-elements, to the second-A/D-converter. The controller calculates the first-location from an A/D-converting operation of the first-signal, and the second-location from an A/D-converting operation of the second-signal. An current-value is calculated in an initial-adjustment-operation adjusting a detecting-resolution in A/D-converting the first-and second-signals, and flows through the coil.

13 Claims, 16 Drawing Sheets

OTHER PUBLICATIONS

U.S. Appl. No. 11/044,054 to Uenaka, filed Jan. 28, 2005.
U.S. Appl. No. 11/065,577 to Uenaka, filed Feb. 25, 2005.
U.S. Appl. No 11/065,354 to Uenaka et al., filed Feb. 25, 2005.
U.S. Appl. No. 11/073,638 to Uenaka et al., filed Mar. 8, 2005.
U.S. Appl. No. 11/073,604 to Uenaka, filed Mar. 8, 2005.
U.S. Appl. No. 11/071,220 to Uenaka et al., filed Mar. 4, 2005.
U.S. Appl. No. 11/044,010 to Uenaka et al., filed Jan. 28, 2005.
U.S. Appl. No. 11/071,241 to Uenaka, filed Mar. 4, 2005.
U.S. Appl. No. 11/071,242 to Uenaka, filed Mar. 4, 2005.
U.S. Appl. No. 11/078,367 to Seo, filed Mar. 14, 2005.
U.S. Appl. No. 11/016,726 to Uenaka, filed Dec. 21, 2004.
English language abstract of the JP 2002-229090.
English language abstract of the JP 2003-110919.
English language abstract of the JP 10-142647.

* cited by examiner

ANTI-SHAKE APPARATUS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus performs a moving operation of a movable unit, which includes a hand-shake correcting lens, by using a permanent magnet and a coil, and a position-detecting operation of the movable unit, by using a hall element and a permanent magnet.

However, in the position-detecting operation, the initial-adjustment operation which adjusts the detecting-resolution in the A/D converting operation for a signal output from the hall element, is performed by changing the value of an amplification rate in the hall-element signal processing circuit. The value of the amplification rate can be changed by changing the value of a resistor in the hall-element signal-processing circuit, so that changing the value of the resistor needs a mechanical adjustment. Accordingly, this initial-adjustment operation is a problem.

SUMMARY OF THE INVENTION

Therefore, an object of the present invention is to provide an apparatus which can perform the initial-adjustment operation adjusting the detecting-resolution in the A/D converting operation of the position-detecting operation for the anti-shake apparatus, by an electrical adjustment without performing the mechanical adjustment.

According to the present invention, an anti-shake apparatus of a photographing apparatus comprises a movable unit, a fixed unit, a signal-processing unit, and a control unit.

The movable unit has one of an imaging device and a hand-shake correcting lens, and can be moved in first and second directions. The first direction is perpendicular to an optical axis of a camera lens of the photographing apparatus. The second direction is perpendicular to the optical axis and the first direction.

The fixed unit slidably supports the movable unit in both the first and second directions, and has a magnetic-field change-detecting unit.

The control unit controls the movable unit, the fixed unit, and the signal-processing unit, and has first and second A/D converters.

The magnetic-field change-detecting unit has first and second horizontal magnetic-field change-detecting elements for detecting a position of the movable unit in the first direction, as a first location, and first and second vertical magnetic-field change-detecting elements for detecting a position of the movable unit in the second direction, as a second location.

The movable unit has a position-detecting magnetic-field generating unit which is used for detecting the first and second locations, and which faces the magnetic-field change-detecting unit, and which has a position-detecting coil.

The position-detecting coil is magnetized by being electrified where an N pole and an S pole are arranged in a third direction which is parallel to the optical axis. The position-detecting coil is wound, such that its outer circumference shape, viewed from the third direction, is a square and faces the magnetic-field change-detecting unit.

An external structure of the square forms lines which are parallel to one of the first direction and the second direction.

The signal-processing unit outputs a first detected-position signal, which specifies the first location on the basis of output signals of the first and second horizontal magnetic-field change-detecting elements, to the first A/D converter, and outputs a second detected-position signal, which specifies the second location on the basis of output signals of the first and second vertical magnetic-field change-detecting elements, to the second A/D converter.

The control unit calculates the first location on the basis of an A/D converting operation by the first A/D converter, for the first detected-position signal, and calculates the second location on the basis of an A/D converting operation by the second A/D converter, for the second detected-position signal.

An optimized coil current-value is calculated in an initial-adjustment operation which adjusts a detecting-resolution when the first and second detected-position signals are A/D converted by the first and second A/D converters, by changing the value of the current which flows through the position-detecting coil.

Current having the optimized coil current-value flows through the position-detecting coil when detecting the position of the movable unit.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
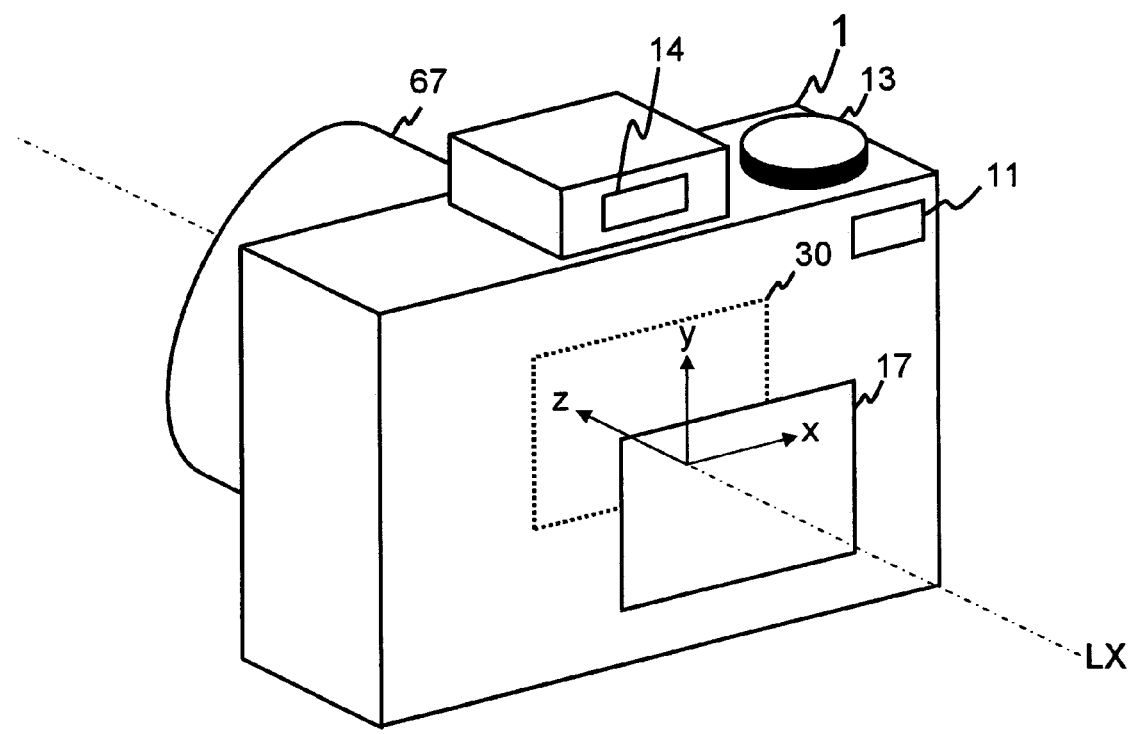
FIG. 1 is a perspective view of a photographing apparatus of the first, second, and third embodiments viewed from the back side of the photographing apparatus.

The present invention is described below with reference to the embodiments shown in the drawings. In these embodiments, the photographing apparatus 1 is a digital camera. The photographing apparatus 1 has an optical axis LX.

In order to explain the direction in these embodiments, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

A first embodiment is explained by using FIGS. 1 to 14.

Figure 4:
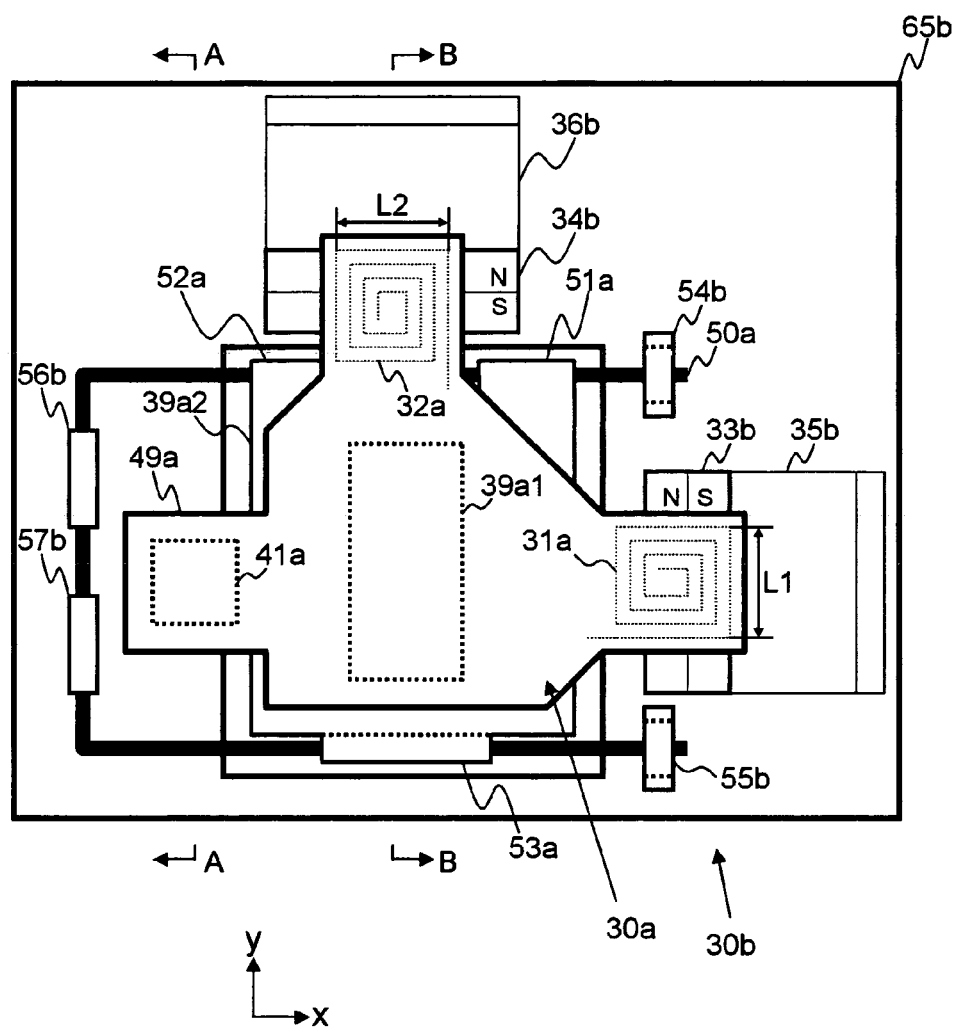
FIG. 4 is a figure showing the construction of the anti-shake unit in the first, second, and third embodiments.
Figure 5:
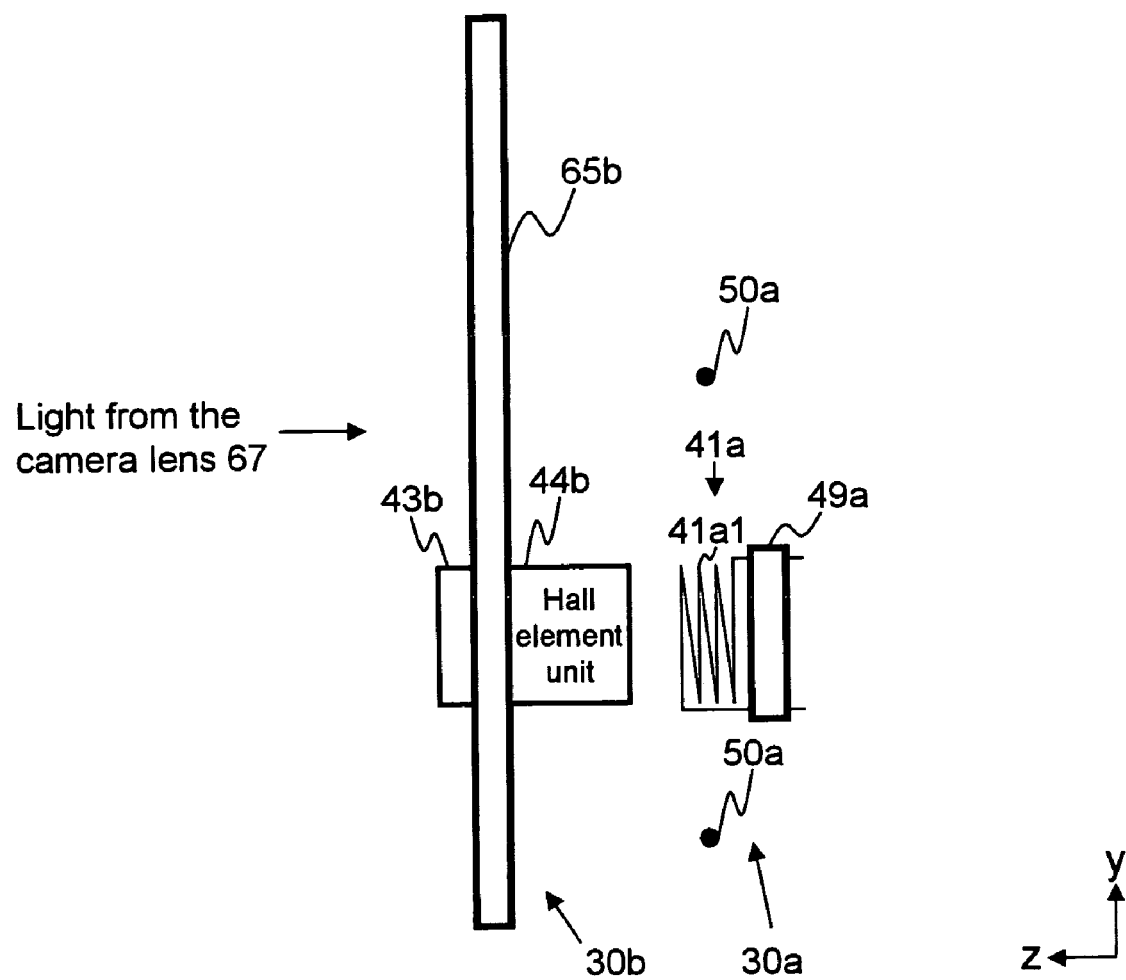
FIG. 5 is a view along line A-A of FIG. 4.
Figure 6:
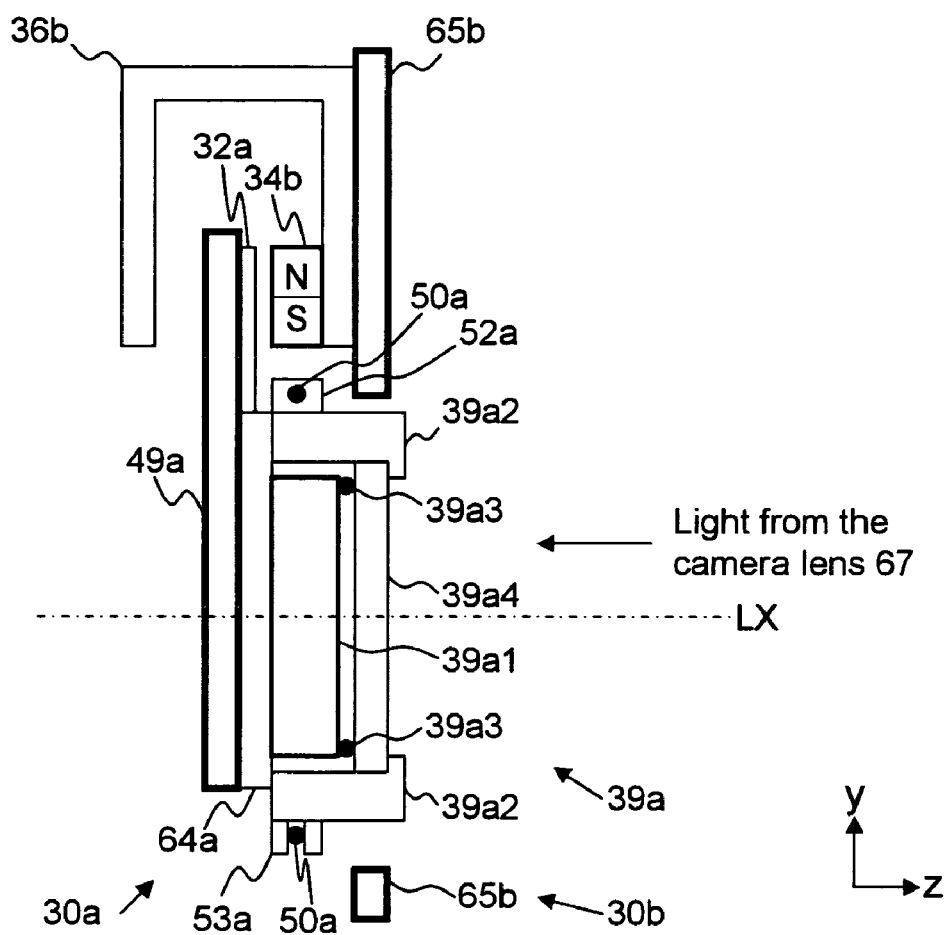
FIG. 6 is a view along line B-B of FIG. 4.

FIG. 5 shows a construction diagram of the section along line A-A of FIG. 4. FIG. 6 shows a construction diagram of the section along line B-B of FIG. 4.

Figure 2:
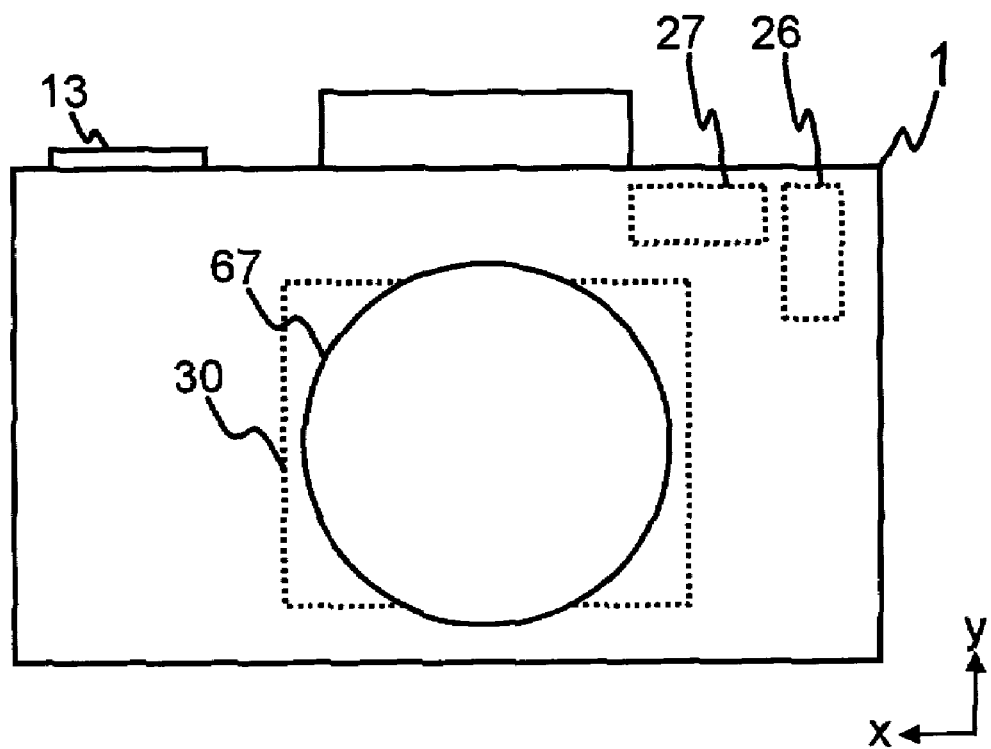
FIG. 2 is a front view of the photographing apparatus in the first, second, and third embodiments.
Figure 3:
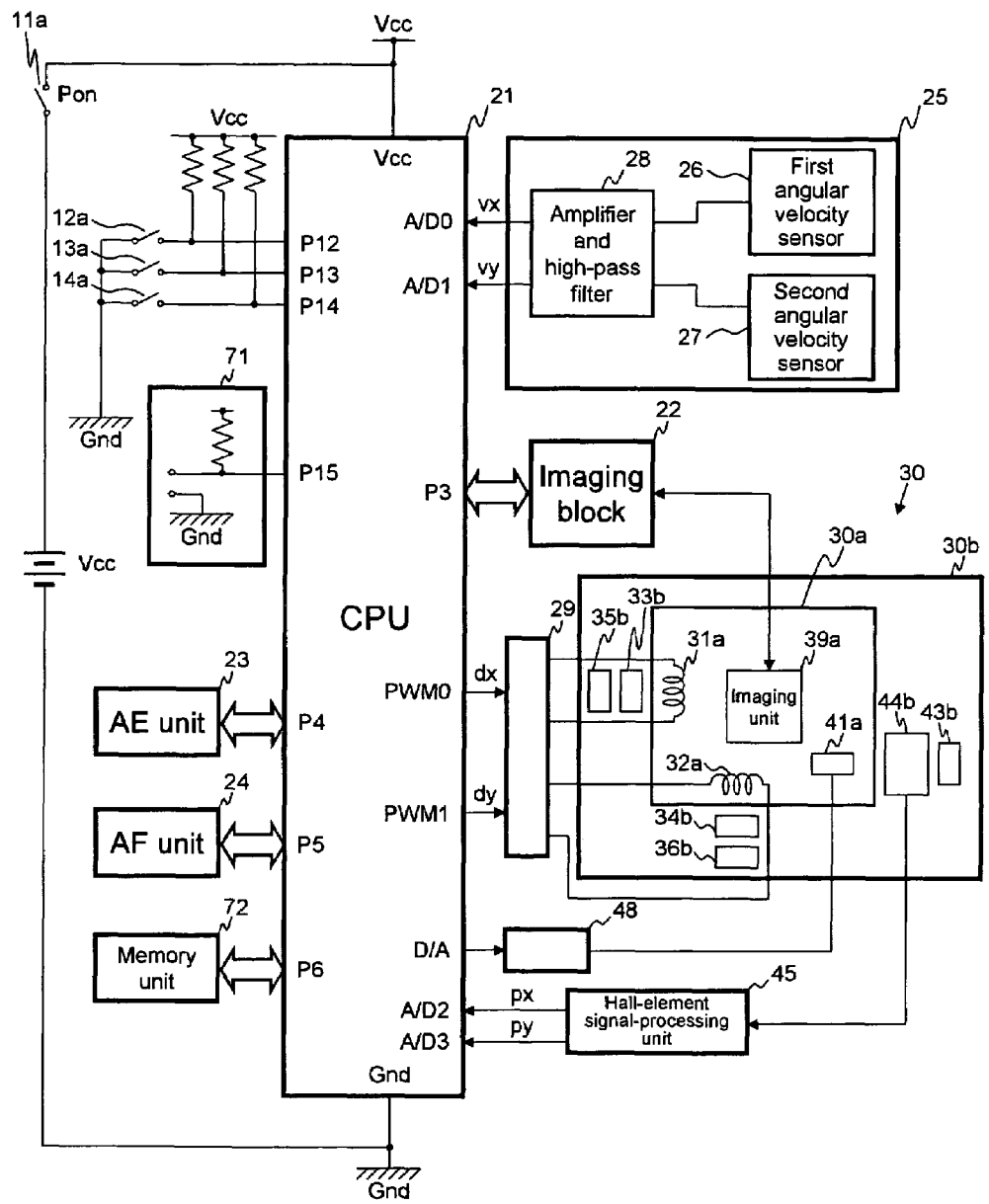
FIG. 3 is a circuit construction diagram of the photographing apparatus in the first, second, and third embodiments.

The imaging part of the photographing apparatus 1 comprises a Pon button 11, a Pon switch 11*a*, a photometric switch 12*a*, a release button 13, a release switch 13*a*, a LCD monitor 17, a CPU 21, an imaging block 22, an AE (automatic exposure) unit 23, an AF (automatic focusing) unit 24, an imaging unit 39*a* in the anti-shake unit 30, and a camera lens 67 (see FIGS. 1, 2, and 3).

Whether the Pon switch 11*a* is in the on state or the off state, is determined by a state of the Pon button 11, so that the ON/OFF states of the photographing apparatus 1 are changed corresponding to the ON/OFF states of the Pon switch 11*a*.

The photographic subject image is taken as an optical image through the camera lens 67 by the imaging block 22, which drives the imaging unit 39*a*, so that the image, which is taken, is indicated on the LCD monitor 17. The photographic subject image can be optically observed by the optical finder (not depicted).

When the release button 13 is half pushed by the operator, the photometric switch 12*a* changes to the on state, so that the photometric operation, the AF sensing operation, and the focusing operation are performed.

When the release button 13 is fully pushed by the operator, the release switch 13*a* changes to the on state, so that the imaging operation is performed, and the image, which is taken, is stored.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30*a* and controls detecting the position of the movable unit 30*a*.

The imaging block 22 drives the imaging unit 39*a*. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the camera lens 67 is moved in the optical axis LX direction.

The anti-shaking part of the photographing apparatus 1 comprises an anti-shake button 14, an anti-shake switch 14*a*, a CPU 21, an angular velocity detecting unit 25, a first driver circuit 29, an anti-shake unit 30, a hall-element signal-processing unit 45, a second driver circuit 48, the camera lens 67, an adjusting unit 71, and a memory unit 72.

When the anti-shake button 14 is fully pushed by the operator, the anti-shake switch 14*a* changes to the on state, so that the anti-shake operation is performed where the angular velocity detecting unit 25 and the anti-shake unit 30 are driven, at every predetermined time interval, independently of the other operations which include the photometric operation etc. When the anti-shake switch 14*a* is in the on state, in other words in the anti-shake mode, the parameter IS is set to 1 (IS=1). When the anti-shake switch 14*a* is not in the on state, in other words in the non anti-shake mode, the parameter IS is set to 0 (IS=0). In the first embodiment, the predetermined time interval is 1 ms.

The various output commands corresponding to the input signals of these switches are controlled by the CPU 21.

The information regarding whether the photometric switch 12*a* is in the on state or in the off state, is input to port P12 of the CPU 21 as a 1-bit digital signal. The information regarding whether the release switch 13*a* is in the on state or in the off state, is input to port P13 of the CPU 21 as a 1-bit digital signal. The information regarding whether the anti-shake switch 14*a* is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

The adjusting unit 71 is a mode switch for switching between a normal use mode and an adjusting mode.

In the adjusting mode, an initial-adjustment operation is performed, which adjusts a detecting-resolution in the A/D converting operation for the first and second detected-position signals px and py, which are analogue signals and are obtained when detecting the position of the movable unit 30*a* using the hall element unit 44*b*.

When the mode switch is set to the on state, the photographing apparatus 1 is set in the adjusting mode. When the mode switch is set to the off state, the adjusting mode is canceled and the photographing apparatus 1 is set in the normal use mode.

The memory unit 72 is a non-volatile memory, such as an EEPROM etc., which stores the optimized coil current-value Di. The memory unit 72 is electrically rewritable, so that a content, which is stored in the memory unit 72, is not deleted even if the memory unit 72 is set to the off state.

The adjusting unit 71 is connected to port P15 of the CPU 21 for inputting and outputting signals. The memory unit 72 is connected to port P6 of the CPU 21 for inputting and outputting signals.

Next, the details of the input and output relationship with the CPU 21 for the angular velocity unit 25, the first driver circuit 29, the anti-shake unit 30, the hall-element signal-processing unit 45, and the second driver circuit 48 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved to, corresponding to the hand-shake quantity which is calculated, for the first direction x and the second direction y. The location in the first direction x of the position S is defined as sx, and the location in the second direction y of the position S is defined as sy. The movement of the movable unit 30a, which includes the imaging unit 39a, is performed by using electromagnetic force and is described later. The driving force D, which drives the first driver circuit 29 in order to move the movable unit 30a to the position S, has a first PWM duty dx as the driving-force component in the first direction x, and a second PWM duty dy as the driving-force component in the second direction The anti-shake unit 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake unit 30 has a movable unit 30a, which includes the imaging unit 39a, and a fixed unit 30b. Or, the anti-shake unit 30 is composed of a driving part which moves the movable unit 30a by electromagnetic force to the position S, and a position-detecting part which detects the position of the movable unit 30a (a detected-position P).

The size and the direction of the electromagnetic force are determined by the size and the direction of the current which flows in the coil, and the size and the direction of the magnetic-field of the magnet.

The driving of the movable unit 30a of the anti-shake unit 30, is performed by the first driver circuit 29 which has the first PWM duty dx input from the PWM 0 of the CPU 21 and has the second PWM duty dy input from the PWM 1 of the CPU 21. The detected-position P of the movable unit 30a either before moving or after moving, which is moved by driving the first driver circuit 29, is detected by the hall element unit 44b and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The movable unit 30a has a first driving coil 31a, a second driving coil 32a, an imaging unit 39a, a position-detecting magnetic-field generating unit 41a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 4, 5, and 6).

The fixed unit 30b has a first permanent driving magnet 33b, a second permanent driving magnet 34b, a first driving yoke 35b, a second driving yoke 36b, a position-detecting yoke 43b, a hall element unit 44b, a first bearing unit for vertical movement 54b, a second bearing unit for vertical movement 55b, a third bearing unit for vertical movement 56b, a fourth bearing unit for vertical movement 57b, and a base board 65b.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y).

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x).

Figure 7:
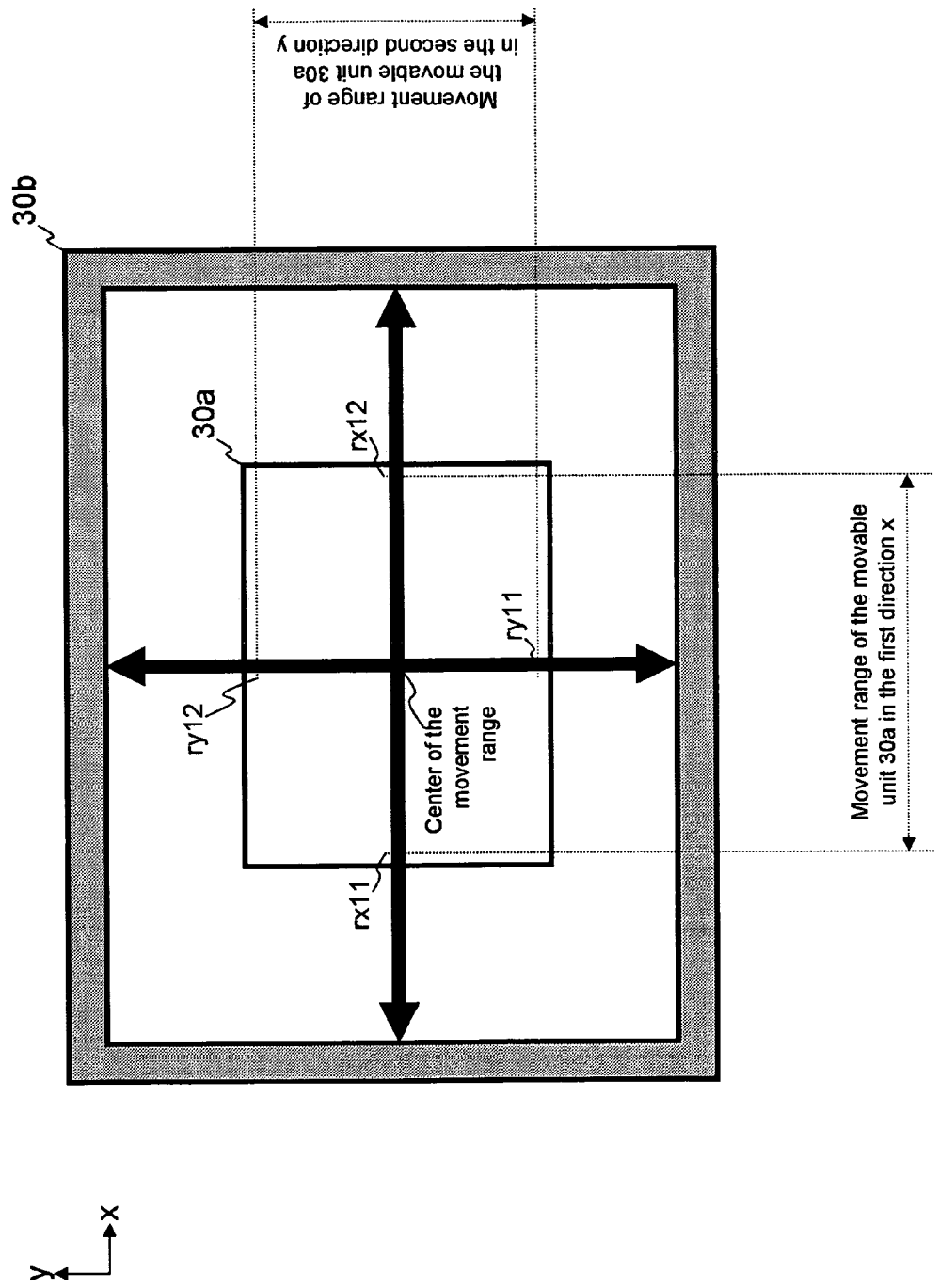
FIG. 7 is a perspective view of the hall element unit and the position-detecting magnetic-field generating unit in the first embodiment.

The movement range of the movable unit 30a means the movement range of the center of the movable unit 30a. One of the edge points in the movement range of the movable unit 30a in the first direction x, is a first horizontal edge-point rx11, another of the edge points in the movement range of the movable unit 30a in the first direction x, is a second horizontal edge-point rx12, one of the edge points in the movement range of the movable unit 30a in the second direction y, is a first vertical edge-point ry11, and another of the edge points in the movement range of the movable unit 30a in the second direction y, is a second vertical edge-point ry12 (see FIG. 7). In FIG. 7, the forms of the movable unit 30a and the fixed unit 30b are simplified.

When the center area of the imaging device 39a1 is located on the optical axis LX of the camera lens 67, the location relation between the movable unit 30a and the fixed unit 30b is set up so that the movable unit 30a is located at the center of its movement range in both the first direction x and the second direction y, in order to utilize the full size of the imaging range of the imaging device 39a1.

A rectangle shape, which forms the imaging surface of the imaging device 39a1, has two diagonal lines. In the first embodiment, the center of the imaging device 39a1 is the crossing point of these two diagonal lines.

The imaging unit 39a, the plate 64a, and the movable circuit board 49a are attached, in this order along the optical axis LX direction, viewed from the side of the camera lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the camera lens 67. In the case where the plate 64a is made of a metallic material, the plate 64a has the effect of radiating heat from the imaging device 39a1, by contacting the imaging device 39a1.

The first driving coil 31a, the second driving coil 32a, and the position-detecting magnetic-field generating unit 41a, are attached to the movable circuit board 49a.

The first driving coil 31a forms a seat and a spiral shape coil pattern. The coil pattern of the first driving coil 31a has lines which are parallel to either the first direction x or the second direction y, where the movable unit 30a which includes the first driving coil 31a, is moved in the first direction x, by a first electro-magnetic force. The lines which are parallel to the second direction y, are used for moving the movable unit 30a in the first direction x. The lines which are parallel to the second direction y, have a first effective length L1.

The first electro-magnetic force occurs on the basis of the current direction of the first driving coil 31a and the magnetic-field direction of the first permanent driving magnet 33b.

The second driving coil 32a forms a seat and a spiral shape coil pattern. The coil pattern of the second driving coil 32a has lines which are parallel to either the first direction x or the second direction y, where the movable unit 30a which includes the second driving coil 32a, is moved in the second direction y, by a second electro-magnetic force. The lines which are parallel to the first direction x, are used for moving the movable unit 30a in the second direction y. The lines which are parallel to the first direction x, have a second effective length L2.

The second electro-magnetic force occurs on the basis of the current direction of the second driving coil 32a and the magnetic-field direction of the second permanent driving magnet 34b.

In the first embodiment, the first driving coil 31a is attached to the right edge area of the movable circuit board 49a (one of the edge areas of the movable circuit board 49a in the first direction x), viewed from the third direction z and the opposite side of the camera lens 67.

Similarly, the second driving coil 32a is attached to the upper area of the movable circuit board 49a (one of the edge areas of the movable circuit board 49a in the second direction y), viewed from the third direction z and the opposite side of the camera lens 67.

Further, the position-detecting magnetic-field generating unit 41a is attached to the left edge area of the movable circuit board 49a (another of the edge areas of the movable circuit board 49a in the first direction x), viewed from the third direction z and the opposite side of the camera lens 67.

The imaging device 39a1 is attached to the middle area of the movable circuit board 49a between the first driving coil 31a and the position-detecting magnetic-field generating unit 41a, in the first direction x.

The first and second driving coils 31a and 32a, the imaging device 39a1, and the position-detecting magnetic-field generating unit 41a, are attached on the same side of the movable circuit board 49a.

The first and second driving coils 31a and 32a are connected with the first driver circuit 29 which drives the first and second driving coils 31a and 32a through the flexible circuit board (not depicted). The first PWM duty dx is input to the first driver circuit 29 from the PWM 0 of the CPU 21, and the second PWM duty dy is input to the first driver circuit 29 from the PWM 1 of the CPU 21. The first driver circuit 29 supplies power to the first driving coil 31a corresponding to the value of the first PWM duty dx, and to the second driving coil 32a corresponding to the value of the second PWM duty dy, to drive the movable unit 30a.

The position-detecting magnetic-field generating unit 41a is used for detecting the first location in the first direction x of the movable unit 30a and the second location in the second direction y of the movable unit 30a.

The position-detecting magnetic-field generating unit 41a has a position-detecting coil 41a1 as a magnetic-field generating apparatus. The position-detecting coil 41a1 is wound, such that its outer circumference shape, viewed from the third direction z, is a square and faces the hall element unit 44b. The external structure of the square forms lines which are parallel to one of the first direction x and the second direction y (see FIG. 8). The N pole and S pole of the position-detecting coil 41a1 are magnetized in the third direction z, when the position-detecting coil 41a1 is electrified.

The position-detecting coil 41a1 is attached to the movable circuit board 49a. The movable circuit board 49a, which is attached to the position-detecting coil 41a1, is not depicted in FIG. 8.

Because the outer circumference shape of the winding of the position-detecting coil 41a1, which faces the fixed unit 30b, is square shaped, detecting the position of the movable unit 30a in the first direction x is not influenced by movement of the movable unit 30a in the second direction y. Further, detecting the position of the movable unit 30a in the second direction y is not influenced by movement of the movable unit 30a in the first direction x.

The position-detecting coil 41a1 is electrified, only when position detecting of the movable unit 30a is performed, so that the position-detecting coil 41a1 is not electrified, when position detecting of the movable unit 30a is not performed.

The position-detecting coil 41a1 is connected with the second driver circuit 48, which drives the position-detecting coil 41a1, through the flexible circuit board (not depicted). The second driver circuit 48 determines the supply of electricity to the position-detecting coil 41a1, on the basis of the on state of the application of voltage from the D/A converter of the CPU 21, and stops the supply of electricity to the position-detecting coil 41a1, on the basis of the off state of the application of voltage from the D/A converter of the CPU 21.

The optimized coil current-value Di which flows through the position-detecting coil 41a1 when detecting the first location in the first direction x of the movable unit 30a and the second location in the second direction y of the movable unit 30a, is determined by the initial-adjustment operation.

In the initial-adjustment operation, a detecting-resolution of the A/D converters A/D 2 for A/D converting the first detected-position signal px, and A/D 3 for A/D converting the second detected-position signal py, is adjusted and improved. Or, the width between the minimum and maximum values of the first detected-position signal px, and the width between the minimum and maximum values of the second detected-position signal py, are maximized, in the movement range of the movable unit 30a, and in the A/D converting range of the CPU 21.

Specifically, in the initial-adjustment operation, first, second, third, and fourth coil current-values Di1, Di2, Di3, and Di4 are calculated, so that the optimized coil current-value Di which is the smallest value of the first, second, third, and fourth coil current-values Di1, Di2, Di3, and Di4, is determined and stored in the memory unit 72.

The first coil current-value Di1 is a value of the current which flows through the position-detecting coil 41a1, when the output value of the first detected-position signal px becomes a maximum value in the A/D converting range of the CPU 21, and when the center of the movable unit 30a contacts the first horizontal edge-point rx11.

The second coil current-value Di2 is a value of the current which flows through the position-detecting coil 41a1, when the output value of the first detected-position signal px becomes a minimum value in the A/D converting range of the CPU 21, and when the center of the movable unit 30a contacts the second horizontal edge-point rx12.

The third coil current-value Di3 is a value of the current which flows through the position-detecting coil 41a1, when the output value of the second detected-position signal py becomes a maximum value in the A/D converting range of the CPU 21, and when the center of the movable unit 30a contacts the first vertical edge-point ry11.

The fourth coil current-value Di4 is a value of the current which flows through the position-detecting coil 41a1, when the output value of the second detected-position signal py becomes a minimum value in the A/D converting range of the CPU 21, and when the center of the movable unit 30a contacts the second vertical edge-point ry12.

Further, the position detecting operation in the first direction x by using the first horizontal hall element hh1 and the second horizontal hall element hh2, and the position detecting operation in the second direction y by using the first vertical hall element hv1 and the second vertical hall element hv2 can be performed by using the same position-detecting magnetic-field generating unit 41a.

The first permanent driving magnet 33b is attached to the movable unit side of the fixed unit 30b, where the first permanent driving magnet 33b faces the first driving coil 31a in the third direction z.

The second permanent driving magnet 34b is attached to the movable unit side of the fixed unit 30b, where the second permanent driving magnet 34b faces the second driving coil 32a in the third direction z.

The hall element unit 44b is attached to the movable unit side of the fixed unit 30b, where the hall element unit 44b faces the position-detecting magnetic-field generating unit 41a.

The position-detecting yoke 43b is attached to a back surface side of the fixed unit 30b, which is the opposite side to the surface having the hall element unit 44b. The position-detecting yoke 43b is made of a magnetic material, and raises the magnetic-flux density between the position-detecting magnetic-field generating unit 41a and the hall element unit 44b.

The first permanent driving magnet 33b is attached to the first driving yoke 35b, under the condition where N pole and S pole are arranged in the first direction x. The first driving yoke 35b is attached to the base board 65b of the fixed unit 30b, on the side of the movable unit 30a, in the third direction z.

The length of the first permanent driving magnet 33b in the second direction y, is longer in comparison with the first effective length L1 of the first driving coil 31a.

The magnetic-field which influences the first driving coil 31a, is not changed during movement of the movable unit 30a in the second direction y.

The second permanent driving magnet 34b is attached to the second driving yoke 36b, under the condition where N pole and S pole are arranged in the second direction y. The second driving yoke 36b is attached to the base board 65b of the fixed unit 30b, on the side of the movable unit 30a, in the third direction z.

The length of the second permanent driving magnet 34b in the first direction x, is longer in comparison with the second effective length L2 of the second driving coil 32a. The magnetic-field which influences the second driving coil 32a, is not changed during movement of the movable unit 30a in the first direction x.

The first driving yoke 35b is made of a soft magnetic material, and forms a square-u-shaped channel when viewed from the second direction y. The first permanent driving magnet 33b and the first driving coil 31a are inside the channel of the first driving yoke 35b.

The side of the first driving yoke 35b, which contacts the first permanent driving magnet 33b, prevents the magnetic-field of the first permanent driving magnet 33b from leaking to the surroundings.

The other side of the first driving yoke 35b (which faces the first permanent driving magnet 33b, the first driving coil 31a, and the movable circuit board 49a) raises the magnetic-flux density between the first permanent driving magnet 33b and the first driving coil 31a.

The second driving yoke 36b is made of a soft magnetic material, and forms a square-u-shaped channel when viewed from the first direction x. The second permanent driving magnet 34b and the second driving coil 32a are inside the channel of the second driving yoke 36b.

The side of the second driving yoke 36b, which contacts the second permanent driving magnet 34b, prevents the magnetic-field of the second permanent driving magnet 34b from leaking to the surroundings.

The other side of the second driving yoke 36b (which faces the second permanent driving magnet 34b, the second driving coil 32a, and the movable circuit board 49a) raises the magnetic-flux density between the second permanent driving magnet 34b and the second driving coil 32a.

Figure 8:
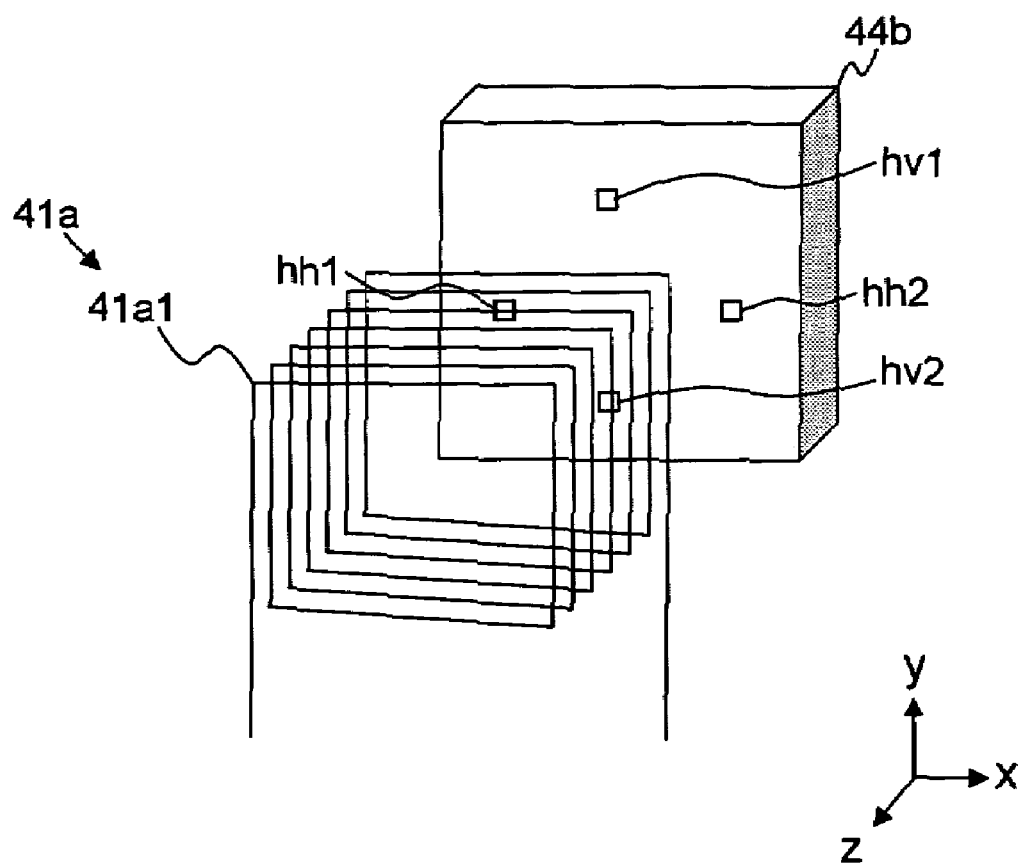
FIG. 8 is a plane view showing a movement range of the movable unit.

The hall element unit 44b is a two-axes hall element which has four hall elements that are magnetoelectric converting elements (magnetic-field change-detecting elements) using the Hall Effect (see FIG. 8). The hall element unit 44b detects the first detected-position signal px, which is used for specifying the first location in the first direction x for the present position P of the movable unit 30a, and the second detected-position signal py, which is used for specifying the second location in the second direction y for the present position P of the movable unit 30a.

Two of the four hall elements are a first horizontal hall element hh1 and a second horizontal hall element hh2 for detecting the first location in the first direction x, so that the others are a first vertical hall element hv1 and a second vertical hall element hv2 for detecting the second location in the second direction y.

An input terminal of the first horizontal hall element hh1 and an input terminal of the second horizontal hall element hh2 are connected in series, in order to detect the first location in the first direction x of the movable unit 30a. The first horizontal hall element hh1 and the second horizontal hall element hh2 are attached to the base board 65b of the fixed unit 30b, under the condition where the first horizontal hall element hh1 and the second horizontal hall element hh2 face the position-detecting magnetic-field generating unit 41a of the movable unit 30a, in the third direction z.

When the center of the imaging device 39a1, passes through the optical axis LX, it is desirable that the first horizontal hall element hh1 is located at a place on the hall element unit 44b which faces midway along a side of the square outer circumference, in the second direction y, of the position-detecting coil 41a1, the second horizontal hall element hh2 is located at a place on the hall element unit 44b which faces midway along the other side of the square outer circumference, in the second direction y, of the position-detecting coil 41a1 (the square outer circumference facing the hall element unit 44b, viewed from the third direction z), to perform the position-detecting operation utilizing the full size of the square outer circumference of the position-detecting coil 41a1 (see FIG. 8).

An input terminal of the first vertical hall element hv1 and an input terminal of the second vertical hall element hv2 are connected in series, in order to detect the second location in the second direction y of the movable unit 30a. The first vertical hall element hv1 and the second vertical hall element hv2 are attached to the base board 65b of the fixed unit 30b, under the condition where the first vertical hall element hv1 and the second vertical hall element hv2 face the position-detecting magnetic-field generating unit 41a of the movable unit 30a, in the third direction z.

When the center of the imaging device 39a1, passes through the optical axis LX, it is desirable that the first vertical hall element hv1 is located at a place on the hall element unit 44b which faces midway along a side of the square outer circumference, in the first direction x, of the position-detecting coil 41a1, the second vertical hall element hv2 is located at a place on the hall element unit 44b which faces midway along the other side of the square outer circumference, in the first direction x, of the position-detecting coil 41a1 (the square front-surface facing the hall element unit 44b, viewed from the third direction z), to perform the position-detecting operation utilizing the full size of the square outer circumference of the position-detecting coil 41a1.

The base board 65b is a plate state member which becomes the base for attaching the hall element unit 44b etc., and is arranged being parallel to the imaging surface of the imaging device 39a1.

In the first embodiment, the base board 65b is arranged at the side nearer to the camera lens 67 in comparison with the movable circuit board 49a, in the third direction z. However, the movable circuit board 49a may be arranged at the side nearer to the camera lens 67 in comparison with the base board 65b. In this case, the first and second driving coils 31a and 32a, and the position-detecting magnetic-field generating unit 41a are arranged on the opposite side of the movable circuit board 49a to the camera lens 67, so that the first and second permanent driving magnets 33b and 34b, and the hall element unit 44b are arranged on the same side of the movable circuit board 49a as the camera lens 67.

The hall-element signal-processing unit 45 detects a first horizontal potential-difference x1 between output terminals of the first horizontal hall element hh1, based on an output signal of the first horizontal hall element hh1.

The hall-element signal-processing unit 45 detects a second horizontal potential-difference x2 between output terminals of the second horizontal hall element hh2, based on an output signal of the second horizontal hall element hh2.

The hall-element signal-processing unit 45 outputs the first detected-position signal px, which specifies the first location in the first direction x of the movable unit 30a, to the A/D converter A/D 2 of the CPU 21, on the basis of the first and second horizontal potential-differences x1 and x2.

The hall-element signal-processing unit 45 detects a first vertical potential-difference y1 between output terminals of the first vertical hall element hv1, based on an output signal of the first vertical hall element hv1.

The hall-element signal-processing unit 45 detects a second vertical potential-difference y2 between output terminals of the second vertical hall element hv2, based on an output signal of the second vertical hall element hv2.

The hall-element signal-processing unit 45 outputs the second detected-position signal py, which specifies the second location in the second direction y of the movable unit 30a, to the A/D converter A/D 3 of the CPU 21, on the basis of the first and second vertical potential-differences y1 and y2.

Figure 9:
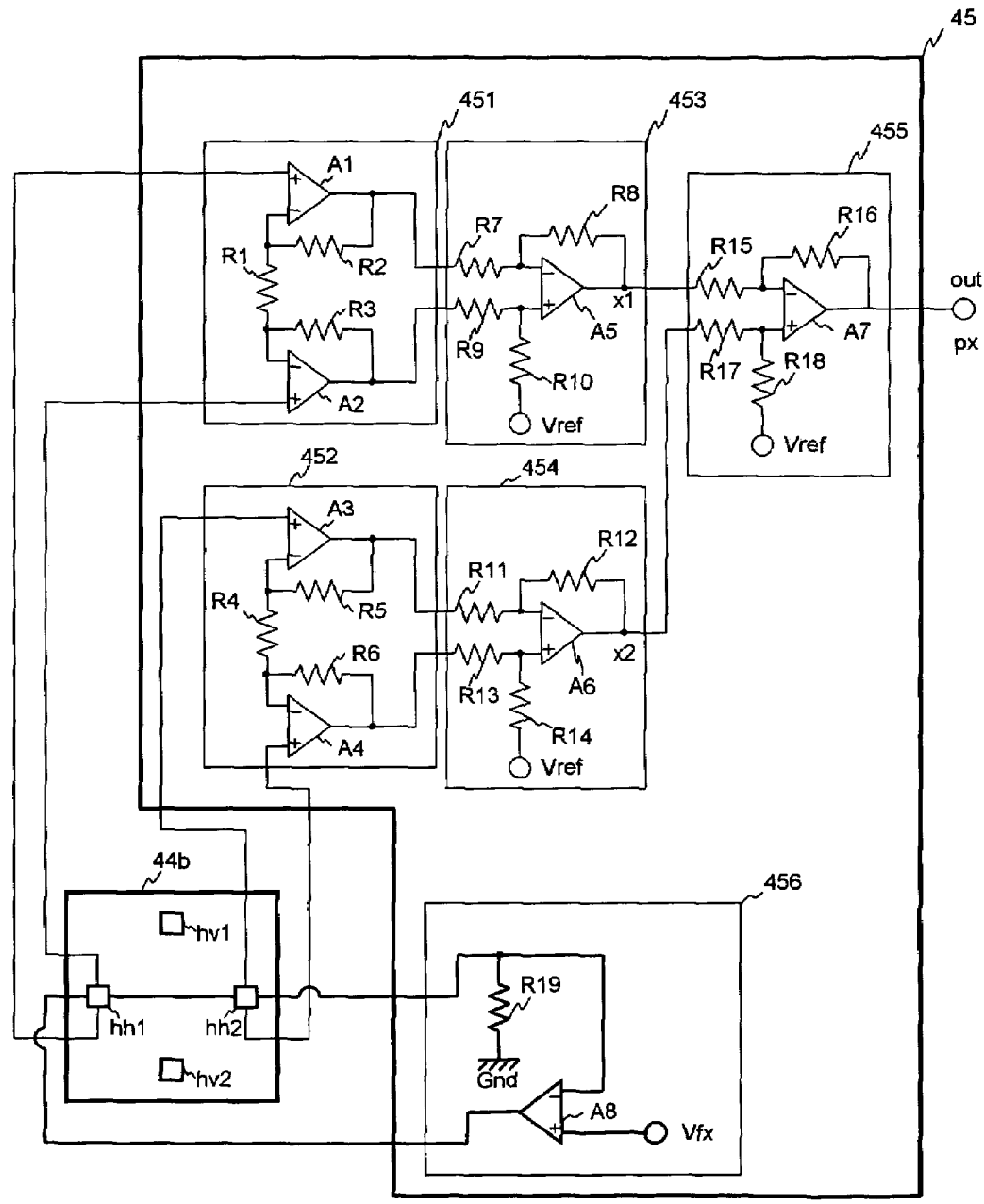
FIG. 9 is a circuit construction diagram of the part of the circuit for detecting the first location in the first direction of the movable unit, with the two-axes hall element and the hall-element signal-processing circuit, in the first, second, and third embodiments.

The circuit construction regarding input/output signals of the first and second horizontal hall elements hh1 and hh2, in the hall-element signal-processing unit 45 is explained using FIG. 9. The circuit construction regarding the first and second vertical hall elements hv1 and hv2 is omitted in FIG. 9, in order to simplify the explanation.

Figure 10:
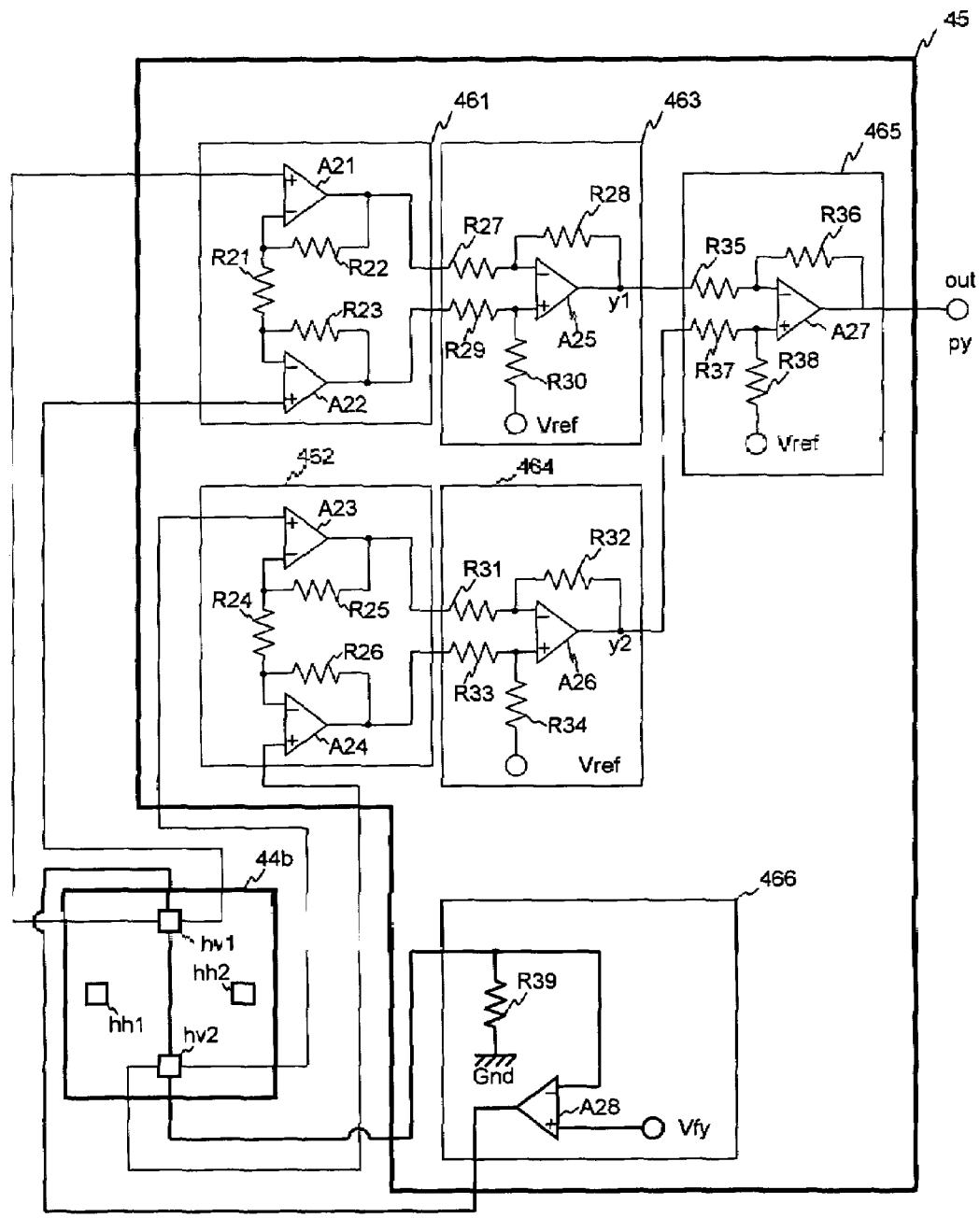
FIG. 10 is a circuit construction diagram of the part of the circuit for detecting the second location in the second direction of the movable unit, with the two-axes hall element and the hall-element signal-processing circuit, in the first, second, and third embodiments.

The circuit construction regarding input/output signals of the first and second vertical hall elements hv1 and hv2, in the hall-element signal-processing unit 45 is explained using FIG. 10. The circuit construction regarding the first and second horizontal hall elements hh1 and hh2 is omitted in FIG. 10, in order to simplify the explanation.

The hall-element signal-processing unit 45 has a circuit 451, a circuit 452, a circuit 453, a circuit 454, and a circuit 455, for controlling the output of the first and second horizontal hall elements hh1 and hh2, and has a circuit 456 for controlling the input of the first and second horizontal hall elements hh1 and hh2.

The hall-element signal-processing unit 45 has a circuit 461, a circuit 462, a circuit 463, a circuit 464, and a circuit 466, for controlling the output of the first and second vertical hall elements hv1 and hv2, and has a circuit 466 for controlling the input of the first and second vertical hall elements hv1 and hv2.

Both output terminals of the first horizontal hall element hh1 are connected with the circuit 451, so that the circuit 451 is connected with the circuit 453.

Both output terminals of the second horizontal hall element hh2 are connected with the circuit 452, so that the circuit 452 is connected with the circuit 454.

The circuits 453 and 454 are connected with the circuit 455.

The circuit 451 is a differential amplifier circuit which amplifies the signal difference between the output terminals of the first horizontal hall element hh1, so that the circuit 452 is a differential amplifier circuit which amplifies the signal difference between the output terminals of the second horizontal hall element hh2.

The circuit 453 is a subtracting circuit which calculates the first horizontal potential-difference x1 on the basis of the difference between the amplified signal difference from the circuit 451 and a reference voltage Vref.

The circuit 454 is a subtracting circuit which calculates the second horizontal potential-difference x2 on the basis of the difference between the amplified signal difference from the circuit 452 and the reference voltage Vref.

The circuit 455 is a subtracting amplifier circuit which calculates the first detected-position signal px by multiplying a first amplification rate AA1 by the difference between the first horizontal potential-difference x1 and the second horizontal potential-difference x2.

The circuit 451 has a resistor R1, a resistor R2, a resistor R3, an operational amplifier A1, and an operational amplifier A2. The operational amplifier A1 has an inverting input terminal, a non-inverting input terminal, and an output terminal. The operational amplifier A2 has an inverting input terminal, a non-inverting input terminal, and an output terminal.

One of the output terminals of the first horizontal hall element hh1 is connected with the non-inverting input terminal of the operational amplifier A1, so that the other terminal of the first horizontal hall element hh1 is connected with the non-inverting input terminal of the operational amplifier A2.

The inverting input terminal of the operational amplifier A1 is connected with the resistors R1 and R2, so that the inverting input terminal of the operational amplifier A2 is connected with the resistors R1 and R3.

The output terminal of the operational amplifier A1 is connected with the resistor R2 and the resistor R7 in the circuit 453. The output terminal of the operational amplifier A2 is connected with the resistor R3 and the resistor R9 in the circuit 453.

The circuit 452 has a resistor R4, a resistor R5, a resistor R6, an operational amplifier A3, and an operational amplifier A4. The operational amplifier A3 has an inverting input terminal, a non-inverting input terminal, and an output terminal. The operational amplifier A4 has an inverting input terminal, a non-inverting input terminal, and an output terminal.

One of the output terminals of the second horizontal hall element hh2 is connected with the non-inverting input terminal of the operational amplifier A3, so that the other terminal of the second horizontal hall element hh2 is connected with the non-inverting input terminal of the operational amplifier A4.

The inverting input terminal of the operational amplifier A3 is connected with the resistors R4 and R5, so that the inverting input terminal of the operational amplifier A4 is connected with the resistor R4 and R6.

The output terminal of the operational amplifier A3 is connected with the resistor R5 and the resistor R11 in the circuit 454. The output terminal of the operational amplifier A4 is connected with the resistor R6 and the resistor R13 in the circuit 454.

The circuit 453 has a resistor R7, a resistor R8, a resistor R9, a resistor R10, and an operational amplifier A5. The operational amplifier A5 has an inverting input terminal, a non-inverting input terminal, and an output terminal.

The inverting input terminal of the operational amplifier A5 is connected with the resistors R7 and R8. The non-inverting input terminal of the operational amplifier A5 is connected with the resistors R9 and R10. The output terminal of the operational amplifier A5 is connected with the resistor R8 and the resistor R15 in the circuit 455. The first horizontal potential-difference x1 is output from the output terminal of the operational amplifier A5. One of the terminals of the resistor R10 is connected with the power supply whose voltage is the reference voltage Vref.

The circuit 454 has a resistor R11, a resistor R12, a resistor R13, a resistor R14, and an operational amplifier A6. The operational amplifier A6 has an inverting input terminal, a non-inverting input terminal, and an output terminal.

The inverting input terminal of the operational amplifier A6 is connected with the resistors R11 and R12.

The non-inverting input terminal of the operational amplifier A6 is connected with the resistors R13 and R14. The output terminal of the operational amplifier A6 is connected with the resistor R12 and the resistor R17 in the circuit 455. The second horizontal potential-difference x2 is output from the output terminal of the operational amplifier A6. One of the terminals of the resistor R14 is connected with the power supply whose voltage is the reference voltage Vref.

The circuit 455 has a resistor R15, a resistor R16, a resistor R17, a resistor R18, and an operational amplifier A7. The operational amplifier A7 has an inverting input terminal, a non-inverting input terminal, and an output terminal.

The inverting input terminal of the operational amplifier A7 is connected with the resistors R15 and R16. The non-inverting input terminal of the operational amplifier A7 is connected with the resistors R17 and R18. The output terminal of the operational amplifier A7 is connected with the resistor R16. The first detected-position signal px, obtained by multiplying the first amplification rate AA1 by the difference between the first horizontal potential-difference x1 and the second horizontal potential-difference x2, is output from the output terminal of the operational amplifier A7. One of the terminals of the resistor R18 is connected with the power supply whose voltage is the reference voltage Vref.

The values of the resistors R1 and R4 are the same. The values of the resistors R2, R3, R5, and R6 are the same. The values of the resistors R7 R14 are the same. The values of the resistors R15 and R17 are the same. The values of the resistors R16 and R18 are the same.

The first amplification rate AA1 is based on the values of the resistors R15~R18 (the ratio of the value of the resistor R15 to the value of the resistor R16).

The operational amplifiers A1~A4 are the same type of amplifier. The operational amplifiers A5 and A6 are the same type of amplifier.

The circuit 456 has a resistor R19 and an operational amplifier AB. The operational amplifier AB has an inverting input terminal, a non-inverting input terminal, and an output terminal.

The inverting input terminal of the operational amplifier A5 is connected with the resistor R19 and one of the input terminals of the second horizontal hall element hh2. The potential of the non-inverting input terminal of the operational amplifier AB is set at voltage Vfx corresponding to the value of the current that flows through the input terminals of the first and second horizontal hall elements hh1 and hh2.

The output terminal of the operational amplifier A8 is connected with the one of the input terminals of the first horizontal hall element hh1. The input terminal of the first horizontal hall element hh1 and the input terminal of the second horizontal hall element hh2 are connected in series. One of the terminals of the resistor R19 is grounded.

Both output terminals of the first vertical hall element hv1 are connected with the circuit 461, so that the circuit 461 is connected with the circuit 463.

Both output terminals of the second vertical hall element hv2 are connected with the circuit 462, so that the circuit 462 is connected with the circuit 464.

The circuits 463 and 464 are connected with the circuit 465.

The circuit 461 is a differential amplifier circuit which amplifies the signal difference between the output terminals of the first vertical hall element hv1, so that the circuit 462 is a differential amplifier circuit which amplifies the signal difference between the output terminals of the second vertical hall element hv2.

The circuit 463 is a subtracting circuit which calculates the first vertical potential-difference y1 on the basis of the difference between the amplified signal difference from the circuit 461 and the reference voltage Vref.

The circuit 464 is a subtracting circuit which calculates the second vertical potential-difference y2 on the basis of the difference between the amplified signal difference from the circuit 462 and the reference voltage Vref.

The circuit 465 is a subtracting amplifier circuit which calculates the second detected-position signal py by multiplying a second amplification rate AA2 by the difference between the first vertical potential-difference y1 and the second vertical potential-difference y2.

The circuit 461 has a resistor R21, a resistor R22, a resistor R23, an operational amplifier A21, and an operational amplifier A22. The operational amplifier A21 has an inverting input terminal, a non-inverting input terminal, and an output terminal. The operational amplifier A22 has an inverting input terminal, a non-inverting input terminal, and an output terminal.

One of the output terminals of the first vertical hall element hv1 is connected with the non-inverting input terminal of the operational amplifier A21, so that the other terminal of the first vertical hall element hv1 is connected with the non-inverting input terminal of the operational amplifier A22.

The inverting input terminal of the operational amplifier A21 is connected with the resistors R21 and R22, so that the inverting input terminal of the operational amplifier A22 is connected with the resistors R21 and R23.

The output terminal of the operational amplifier A21 is connected with the resistor R22 and the resistor R27 in the circuit 463. The output terminal of the operational amplifier A22 is connected with the resistor R23 and the resistor R29 in the circuit 463.

The circuit 462 has a resistor R24, a resistor R25, a resistor R26, an operational amplifier A23, and an operational amplifier A24. The operational amplifier A23 has an inverting input terminal, a non-inverting input terminal, and an output terminal. The operational amplifier A24 has an inverting input terminal, a non-inverting input terminal, and an output terminal.

One of the output terminals of the second vertical hall element hv2 is connected with the non-inverting input terminal of the operational amplifier A23, so that the other terminal of the second vertical hall element hv2 is connected with the non-inverting input terminal of the operational amplifier A24.

The inverting input terminal of the operational amplifier A23 is connected with the resistors R24 and R25, so that the inverting input terminal of the operational amplifier A24 is connected with the resistor R24 and R26.

The output terminal of the operational amplifier A23 is connected with the resistor R25 and the resistor R31 in the circuit 464. The output terminal of the operational amplifier A24 is connected with the resistor R26 and the resistor R33 in the circuit 464.

The circuit 463 has a resistor R27, a resistor R28, a resistor R29, a resistor R30, and an operational amplifier A25. The operational amplifier A25 has an inverting input terminal, a non-inverting input terminal, and an output terminal.

The inverting input terminal of the operational amplifier A25 is connected with the resistors R27 and R28. The non-inverting input terminal of the operational amplifier A25 is connected with the resistors R29 and R30. The output terminal of the operational amplifier A25 is connected with the resistor R28 and the resistor R35 in the circuit 465. The first vertical potential-difference y1 is output from the output terminal of the operational amplifier A25. One of the terminals of the resistor R30 is connected with the power supply whose voltage is the reference voltage Vref.

The circuit 464 has a resistor R31, a resistor R32, a resistor R33, a resistor R34, and an operational amplifier A26. The operational amplifier A26 has an inverting input terminal, a non-inverting input terminal, and an output terminal.

The inverting input terminal of the operational amplifier A26 is connected with the resistors R31 and R32.

The non-inverting input terminal of the operational amplifier A26 is connected with the resistors R33 and R34. The output terminal of the operational amplifier A26 is connected with the resistor R32 and the resistor R37 in the circuit 465. The second vertical potential-difference y2 is output from the output terminal of the operational amplifier A26. One of the terminals of the resistor R34 is connected with the power supply whose voltage is the reference voltage Vref.

The circuit 465 has a resistor R35, a resistor R36, a resistor R37, a resistor R38, and an operational amplifier A27. The operational amplifier A27 has an inverting input terminal, a non-inverting input terminal, and an output terminal.

The inverting input terminal of the operational amplifier A27 is connected with the resistors R35 and R36. The non-inverting input terminal of the operational amplifier A27 is connected with the resistors R37 and R38.

The output terminal of the operational amplifier A27 is connected with the resistor R36. The second detected-position signal py, obtained by multiplying the second amplification rate AA2 by the difference between the first vertical potential-difference y1 and the second vertical potential-difference y2, is output from the output terminal of the operational amplifier A27. One of the terminals of the resistor R38 is connected with the power supply whose voltage is the reference voltage Vref. The values of the resistors R21 and R24 are the same. The values of the resistors R22, R23, R25, and R26 are the same. The values of the resistors R27~R34 are the same. The values of the resistors R35 and R37 are the same. The values of the resistors R36 and R38 are the same.

The second amplification rate AA2 is based on the values of the resistors R35~R38 (the ratio of the value of the resistor R35 to the value of the resistor R36).

The operational amplifiers A21~A24 are the same type of amplifier. The operational amplifiers A25 and A26 are the same type of amplifier.

The circuit 466 has a resistor R39 and an operational amplifier A28. The operational amplifier A28 has an inverting input terminal, a non-inverting input terminal, and an output terminal.

The inverting input terminal of the operational amplifier A28 is connected with the resistor R39 and one of the input terminals of the second vertical hall element hv2. The potential of the non-inverting input terminal of the operational amplifier A28 is set at voltage Vfy corresponding to the value of the current that flows through the input terminals of the first and second vertical hall elements hv1 and hv2.

The output terminal of the operational amplifier A28 is connected with the one of the input terminals of the first vertical hall element hv1. The input terminal of the first vertical hall element hv1 and the input terminal of the second vertical hall element hv2 are connected in series. One of the terminals of the resistor R39 is grounded.

The initial-adjustment operation which adjusts the detecting-resolution in the A/D converting operation for the first and second detected-position signals px and py, can also be performed by changing the values of the first and second amplification rates AA1 and AA2. The value of the first amplification rate AA1 can be changed corresponding to changing the values of the resistors R16 and R18 in the circuit 455. The values of the second amplification rate AA2 can be changed corresponding to changing the values of the resistors R36 and R38 in the circuit 465. Changing the values of the resistors needs a mechanical adjustment. Accordingly, this initial-adjustment operation is a problem.

In the initial-adjustment operation of the first embodiment, the values of the first and second amplification rates AA1 and AA2 are fixed (not changed), so that the value of the current which flows through the position-detecting coil 41a1, are changed (adjusted).

Figure 11:
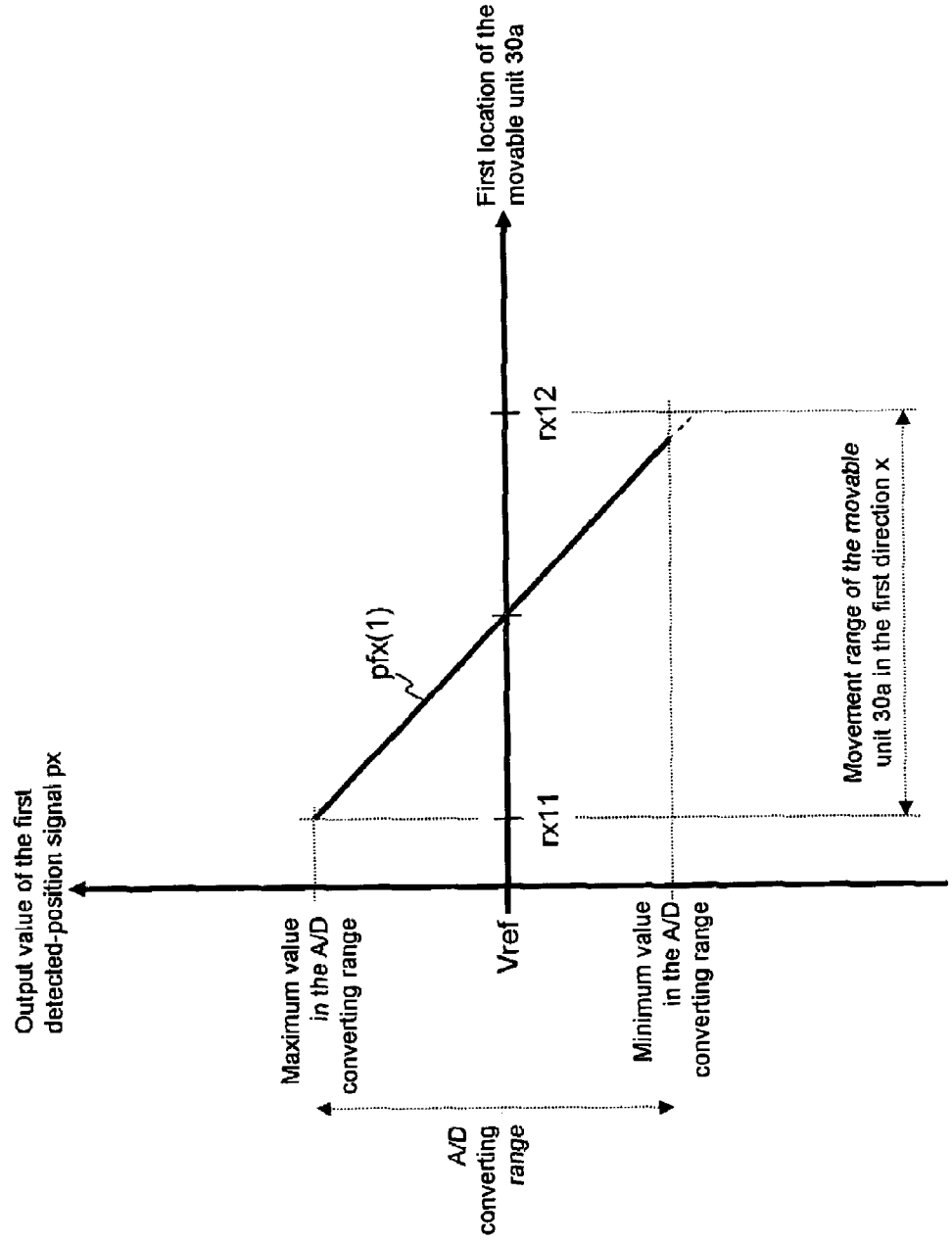
FIG. 11 shows a relationship between the first location in the first direction of the movable unit and the output value of the first detected-position signal, when the center of the movable unit contacts the first horizontal edge-point, and when the value of the current (the first coil current-value) which flows through the position-detecting coil, is adjusted where the output value of the first detected-position signal is the same as the maximum value in the A/D converting range of the A/D converter of the CPU.
Figure 12:
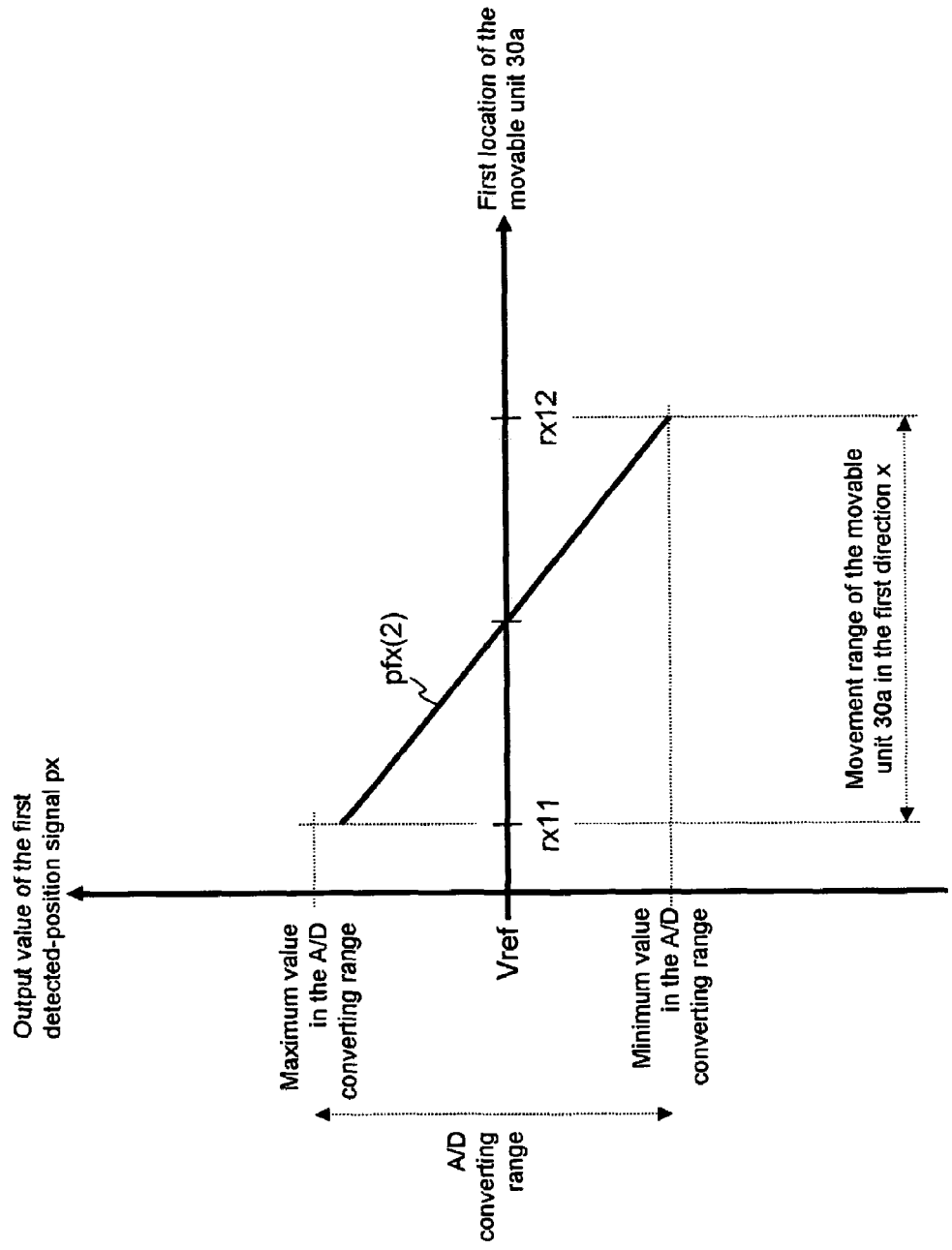
FIG. 12 shows a relationship between the first location in the first direction of the movable unit and the output value of the first detected-position signal, when the center of the movable unit contacts the second horizontal edge-point, and when the value of the current (the second coil current-value) which flows through the position-detecting coil, is adjusted where the output value of the first detected-position signal is the same as the minimum value in the A/D converting range of the A/D converter of the CPU.

Specifically, the initial-adjustment operation is explained by using FIGS. 11 and 12.

FIG. 11 shows a relationship between the first location in the first direction x of the movable unit 30a and the output value of the first detected-position signal px, when the center of the movable unit 30a contacts the first horizontal edge-point rx11, and when the value of the current (the first coil current-value Di1) which flows through the position-detecting coil 41a1, is adjusted, where the output value of the first detected-position signal px is the same as the maximum value in the A/D converting range of the A/D converter A/D 2 of the CPU 21.

A first line pfx(1) in FIG. 11 is composed of a thick line and a broken line. The broken line part of the first line pfx(1) shows a condition where the output value of the first detected-position signal px is under the minimum value in the A/D converting range of the A/D converter A/D 2 of the CPU 21, so that an accurate position detecting operation can not be performed, when the center of the movable unit 30a contacts the second horizontal edge-point rx12.

FIG. 12 shows a relationship between the first location in the first direction x of the movable unit 30a and the output value of the first detected-position signal px, when the center of the movable unit 30a contacts the second horizontal edge-point rx12, and when the value of the current (the second coil current-value Di2) which flows through the position-detecting coil 41a1, is adjusted, where the output value of the first detected-position signal px is the same as the minimum value in the A/D converting range of the A/D converter A/D 2 of the CPU 21.

A second line pfx(2) in FIG. 12 is composed of a thick line. The thick line of the second line pfx(2) shows a condition where the output value of the first detected-position signal px is not over the maximum value in the A/D converting range of the A/D converter A/D 2 of the CPU 21, so that an accurate position detecting operation can be performed, when the center of the movable unit 30a contacts the first horizontal edge-point rx11.

Accordingly, the accurate position detecting operation can be performed in the movement range of the movable unit 30a in the first direction x.

Similarly, when the center of the movable unit 30a contacts the first vertical edge-point ry11, the value of the current (the third coil current-value Di3) which flows through the position-detecting coil 41a1, is adjusted, where the output value of the second detected-position signal py is the same as the maximum value in the A/D converting range of the A/D converter A/D 3 of the CPU 21.

Further, when the center of the movable unit 30a contacts the second vertical edge-point ry12, the value of the current (the fourth coil current-value Di4) which flows through the position-detecting coil 41a1, is adjusted, where the output value of the second detected-position signal py is the same as the minimum value in the A/D converting range of the A/D converter A/D 3 of the CPU 21.

The first detected-position signal px is a functional of a first magnetic-flux density B1 between the first and second horizontal hall elements hh1 and hh2 and the position detecting magnetic-field generating unit 41a, and a value of the current which flows through the position-detecting coil 41a1.

The second detected-position signal py is a functional of a second magnetic-flux density B2 between the first and second vertical hall elements hv1 and hv2 and the position detecting magnetic-field generating unit 41a, and a value of the current which flows through the position-detecting coil 41a1.

It is judged which is the smallest value of the first to fourth coil current-values Di1 to Di4, so that the smallest value of the first to fourth coil current-values Di1 to Di4, is determined as the optimized coil current-value Di.

In this example which is shown in FIGS. 11 and 12, the second coil current-value Di2 is smaller than the first coil current-value Di1, so that the smallest value of the second to fourth coil current-values Di2 to Di4 is determined as the optimized coil current-value Di.

The optimized coil current-value Di is stored in the memory unit 72.

When the movable unit 30a is located at the center of its movement range in both the first direction x and the second direction y, and when the output value of the first detected-position signal px agrees with the reference voltage Vref, the first and second coil current-values Di1 and Di2 are the same. Or, when a value of the current which flows through the position-detecting coil 41a1, is set under the condition where a maximum output value of the first detected-position signal px agrees with the maximum value in the A/D converting range of the A/D converter A/D 2 of the CPU 21, a minimum output value of the first detected-position signal px agrees with the minimum value in the A/D converting range of the A/D converter A/D 2 of the CPU 21.

However, in order to make the output value of the first detected-position signal px strictly agree with the reference voltage Vref, when the movable unit 30a is located at the center of its movement range, an additional adjustment, which considers mechanical gaps of the anti-shake unit 30 and error in the values of the resistors of the hall-element signal-processing unit 45, is needed.

A relationship between the second detected-position signal py and the third and fourth coil current-values Di3 and Di4, is similar to that between the first detected-position signal px and the first and second coil current-values Di1 and Di2, which is described above.

In the first embodiment, the optimized coil current-value Di can be calculated without strict agreement between the output value of the first detected-position signal px and the reference voltage Vref, and between the output value of the second detected-position signal py and the reference voltage Vref.

Further, the initial-adjustment operation is composed of an electrical adjustment which adjusts the value of the current which flows through the position-detecting coil 41a1 (not a mechanical adjustment). Accordingly, usability can be improved in comparison with when the initial-adjustment operation includes a mechanical adjustment for adjusting the values of the resistors etc.

Further, because the optimized coil current-value Di is stored in the memory unit 72, this value is not deleted even if the photographing apparatus 1 (the memory unit 72) is set to the off state (power off). Accordingly, the initial-adjustment operation may be performed only one time, in order for the CPU 21 to read the optimized coil current-value Di.

Figure 13:
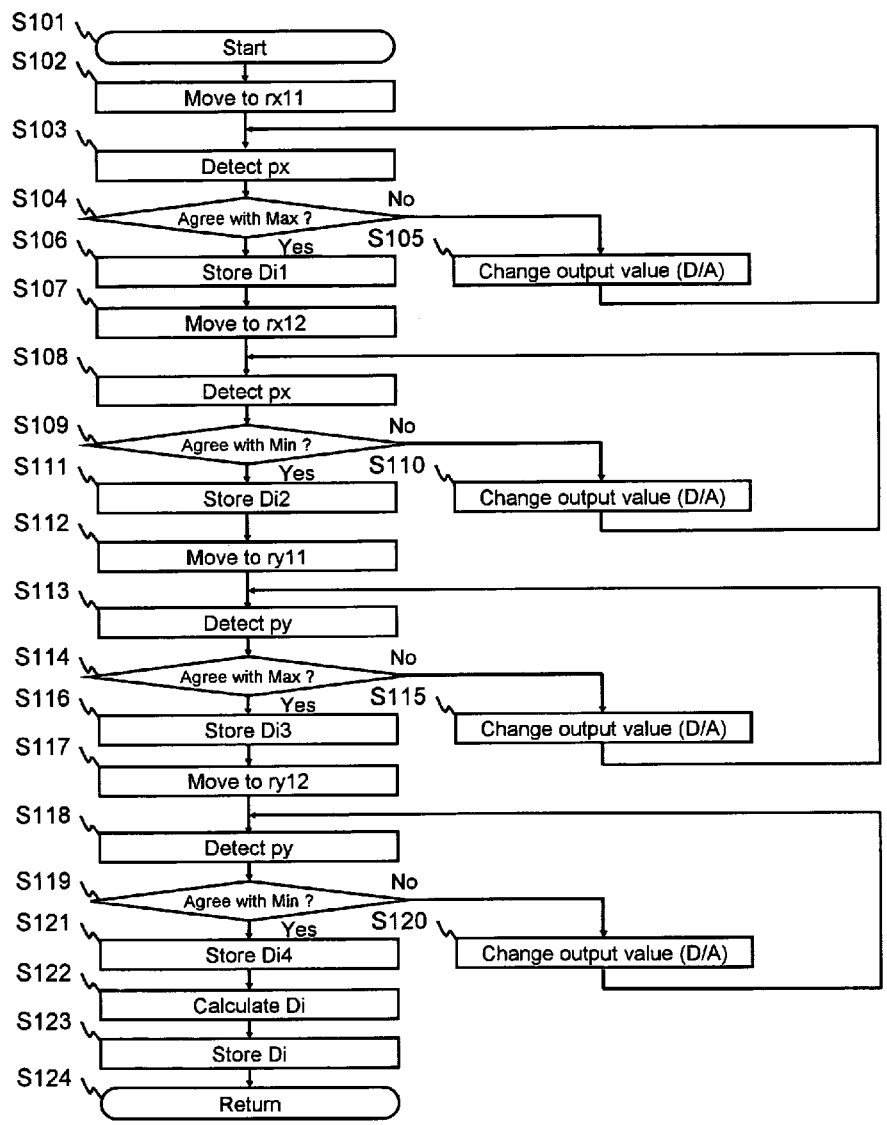
FIG. 13 is a flowchart that shows the initial-adjustment operation.

Next, the flow of the initial-adjustment operation is explained by using the flowchart in FIG. 13.

In step S101, the adjusting unit 71 is set to the on state, so that the photographing apparatus 1 is set in the adjusting mode, and the initial-adjustment operation is started.

In step S102, the first PWM duty dx is input to the first driver circuit 29 from the PWM 0 of the CPU 21, so that the movable unit 30a is moved to where the center of the movable unit 30a contacts the first horizontal edge-point rx11. In step S103, the first detected-position signal px, is detected at this time and is input to the A/D converter A/D 2 of the CPU 21.

In step S104, it is judged whether the output value of the first detected-position signal px agrees with the maximum value in the A/D converting range of the A/D converter A/D 2 of the CPU 21.

When it is judged that the output value of the first detected-position signal px does not agree with the maximum value in the A/D converting range of the A/D converter A/D 2 of the CPU 21, the output value, which is output to the second driver circuit 48, from the D/A converter D/A of the CPU 21, is changed, so that the flow is returned to step S103, in step S105.

When it is judged that the output value of the first detected-position signal px agrees with the maximum value in the A/D converting range of the A/D converter A/D 2 of the CPU 21, the value of the current (the first coil current-value Di1) which flows through the position-detecting coil 41a1 at this time, is temporarily stored in the CPU 21 etc, in step S106.

In step S107, the first PWM duty dx is input to the first driver circuit 29 from the PWM 0 of the CPU 21, so that the movable unit 30a is moved to where the center of the movable unit 30a contacts the second horizontal edge-point rx12. In step S108, the first detected-position signal px at this time, is detected and is input to the A/D converter A/D 2 of the CPU 21.

In step S109, it is judged whether the output value of the first detected-position signal px agrees with the minimum value in the A/D converting range of the A/D converter A/D 2 of the CPU 21.

When it is judged that the output value of the first detected-position signal px does not agree with the minimum value in the A/D converting range of the A/D converter A/D 2 of the CPU 21, the output value, which is output to the second driver circuit 48, from the D/A converter D/A of the CPU 21, is changed, so that the flow is returned to step S108, in step S110.

When it is judged that the output value of the first detected-position signal px agrees with the minimum value in the A/D converting range of the A/D converter A/D 2 of the CPU 21, the value of the current (the second coil current-value Di2) which flows through the position-detecting coil 41a1 at this time, is temporarily stored in the CPU 21 etc, in step S111.

In step S112, the second PWM duty dy is input to the first driver circuit 29 from the PWM 1 of the CPU 21, so that the movable unit 30a is moved to where the center of the movable unit 30a contacts the first vertical edge-point ry11. In step S113, the second detected-position signal py at this time, is detected and is input to the A/D converter A/D 3 of the CPU 21.

In step S114, it is judged whether the output value of the second detected-position signal py agrees with the maximum value in the A/D converting range of the A/D converter A/D 3 of the CPU 21.

When it is judged that the output value of the second detected-position signal py does not agree with the maximum value in the A/D converting range of the A/D converter A/D 3 of the CPU 21, the output value, which is output to the second driver circuit 48, from the D/A converter D/A of the CPU 21, is changed, so that the flow is returned to step S113, in step S115.

When it is judged that the output value of the second detected-position signal py agrees with the maximum value in the A/D converting range of the A/D converter A/D 3 of the CPU 21, the value of the current (the third current-value Di3) which flows through the position-detecting coil 41a1 at this time, is temporarily stored in the CPU 21 etc, in step S116.

In step S117, the second PWM duty dy is input to the first driver circuit 29 from the PWM 1 of the CPU 21, so that the movable unit 30a is moved to where the center of the movable unit 30a contacts the second vertical edge-point ry12. In step S118, the second detected-position signal py at this time, is detected and is input to the A/D converter A/D 3 of the CPU 21.

In step S119, it is judged whether the output value of the second detected-position signal py agrees with the minimum value in the A/D converting range of the A/D converter A/D 3 of the CPU 21.

When it is judged that the output value of the second detected-position signal py does not agree with the minimum value in the A/D converting range of the A/D converter A/D 3 of the CPU 21, the output value, which is output to the second driver circuit 48, from the D/A converter D/A of the CPU 21, is changed, so that the flow is returned to step S118, in step S120.

When it is judged that the output value of the second detected-position signal py agrees with the minimum value in the A/D converting range of the A/D converter A/D 3 of the CPU 21, the value of the current (the fourth coil current-value Di4) which flows through the position-detecting coil 41a1 at this time, is temporarily stored in the CPU 21 etc, in step S121.

In step S122, it is judged which is the smallest value of the first to fourth coil current-values Di1 to Di4, so that the optimized coil current-value Di is determined. In step S123, the optimized coil current-value Di is stored in the memory unit 72, so that the initial-adjustment operation is finished, in step S124.

Figure 14:
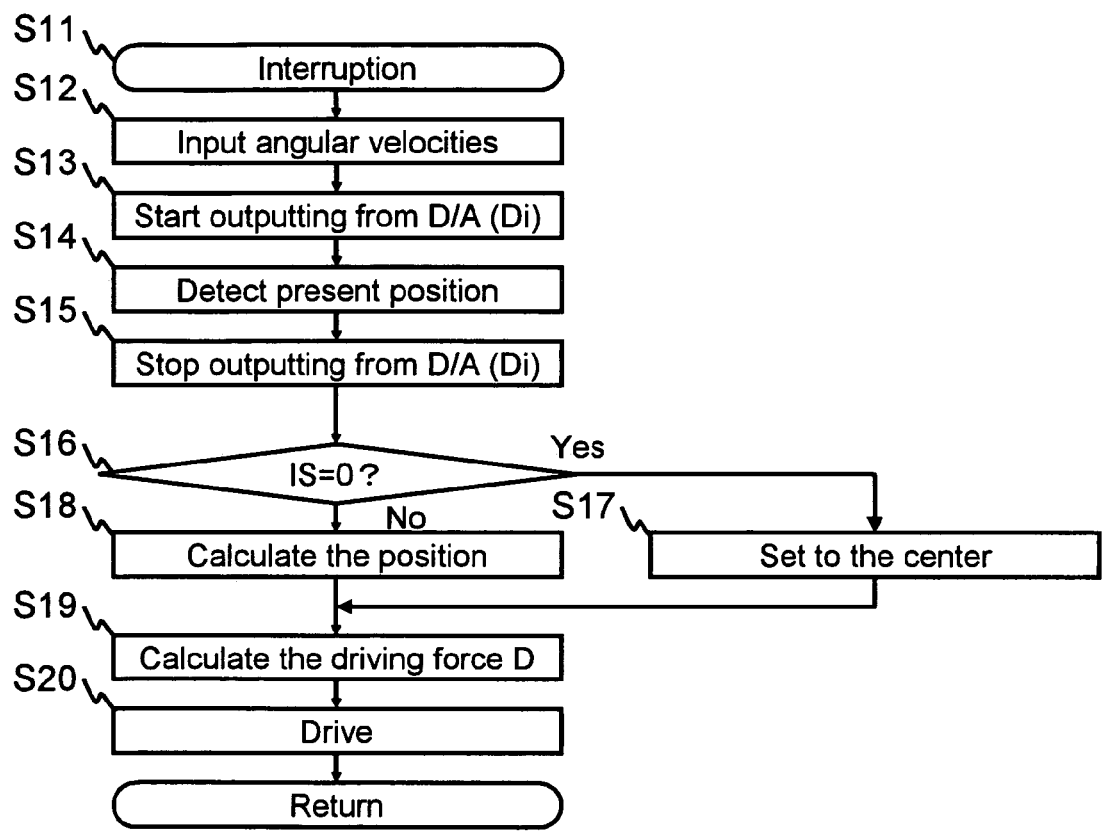
FIG. 14 is a flowchart of the anti-shake operation, which is performed at every predetermined time interval, as an interruption process.

Next, the flow of the anti-shake operation, which is performed at every predetermined time interval (1 ms) as an interruption process, independently of the other operations, is explained by using the flowchart in FIG. 14.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the application of voltage to the second driver circuit 48 by the output from the D/A converter D/A of the CPU 21 is started, so that the position-detecting coil 41a1 is driven where the value of the current which flows through the position-detecting coil 41a1 is the optimized coil current-value Di.

In step S14, the position of the movable unit 30a is detected by the hall element unit 44b, so that the first detected-position signal px, which is calculated by the hall-element signal-processing unit 45, is input to the A/D converter A/D 2 of the CPU 21 and is converted to a digital signal, and the second detected-position signal py, which is calculated by the hall-element signal-processing unit 45, is input to the A/D converter A/D 3 of the CPU 21 and is converted to a digital signal. Therefore, the present position of the movable unit 30a P (pdx, pdy) is determined.

In step S15, the application of voltage to the second driver circuit 48 by the output from the D/A converter D/A of the CPU 21 is stopped, so that driving the position-detecting coil 41a1 is stopped.

In step S16, it is judged whether the value of the IS is 0. When it is judged that the value of the IS is 0 (IS=0), in other words in the non anti-shake mode, the position S (sx, sy) of the movable unit 30a (the imaging unit 39a), which should be moved to, is set to the center of its movement range, in step S17. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S18.

In step S19, the driving force D, which drives the first driver circuit 29 in order to move the movable unit 30a to the position S, in other words the first PWM duty dx and the second PWM duty dy, is calculated on the basis of the position S (sx, sy), which is determined in step S17 or step S18, and the present position P (pdx, pdy).

In step S20, the first driving coil 31a is driven by using the first PWM duty dx through the first driver circuit 29, and the second driving coil 32a is driven by using the second PWM duty dy through the first driver circuit 29, so that the movable unit 30a is moved.

The process in steps S19 and S20 is an automatic control calculation, which is used with the PID automatic control for performing general (normal) proportional, integral, and differential calculations.

Figure 15:
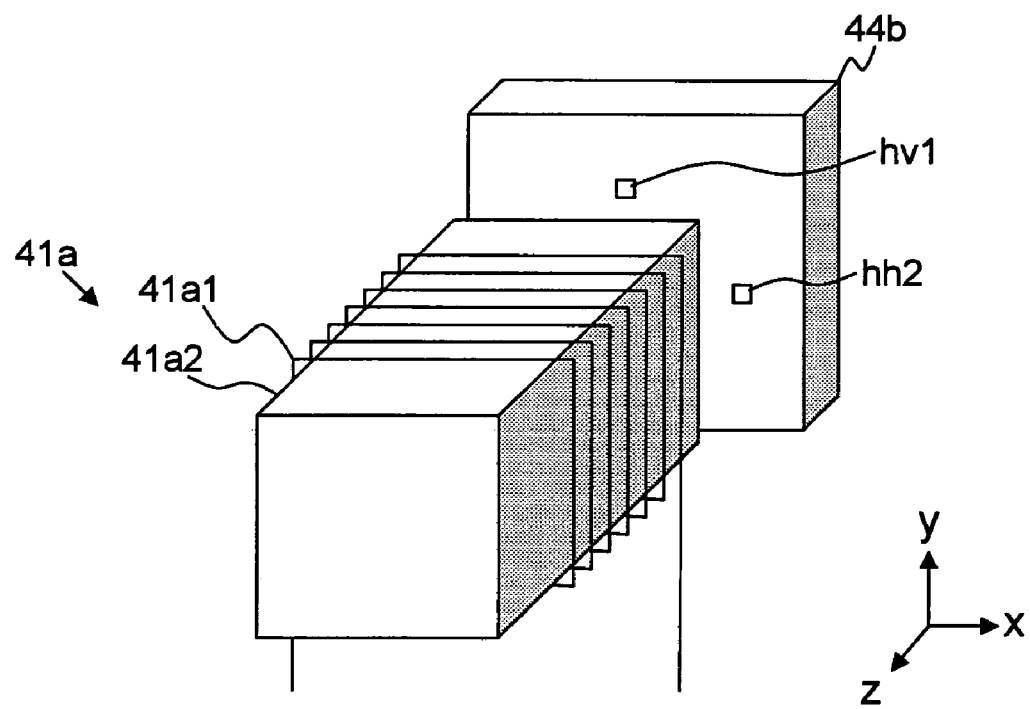
FIG. 15 is a perspective view of the hall element unit and the position-detecting magnetic-field generating unit in the second embodiment.

Next, the second embodiment is explained. In the second embodiment, the position-detecting magnetic-field generating unit 41a has a magnetic core 41a2 (see FIG. 15).

The position-detecting coil 41a1 is wound around a magnetic core 41a2. The magnetic core 41a2 is made of a magnetic material such as iron etc.

The magnetic core 41a2 has a rectangular prism form (a cuboid). The rectangular prism form has a front-surface which faces the hall element unit 44b. The front-surface is a square shape which is the same as the outer circumference of the position-detecting coil 41a1, viewed from the third direction z.

The other constructions of the photographing apparatus 1 in the second embodiment are the same as those in the first embodiment.

A condition where magnetic-flux passes through the magnetic core 41a2 is better than that through the air, in other words the relative magnetic permeability of the magnetic core 41a2 is larger than that with air. Accordingly, when the magnetic core 41a2 is used in the position-detecting magnetic-field generating unit 41a, the inductance of the position-detecting coil 41a1 is increased, and the magnetic-flux density between the position-detecting magnetic-field generating unit 41a and the hall element unit 44b is increased, and then the accuracy of the position-detecting is improved in comparison with when the magnetic core 41a2 is not used in the position-detecting magnetic-field generating unit 41a like in the first embodiment.

Figure 16:
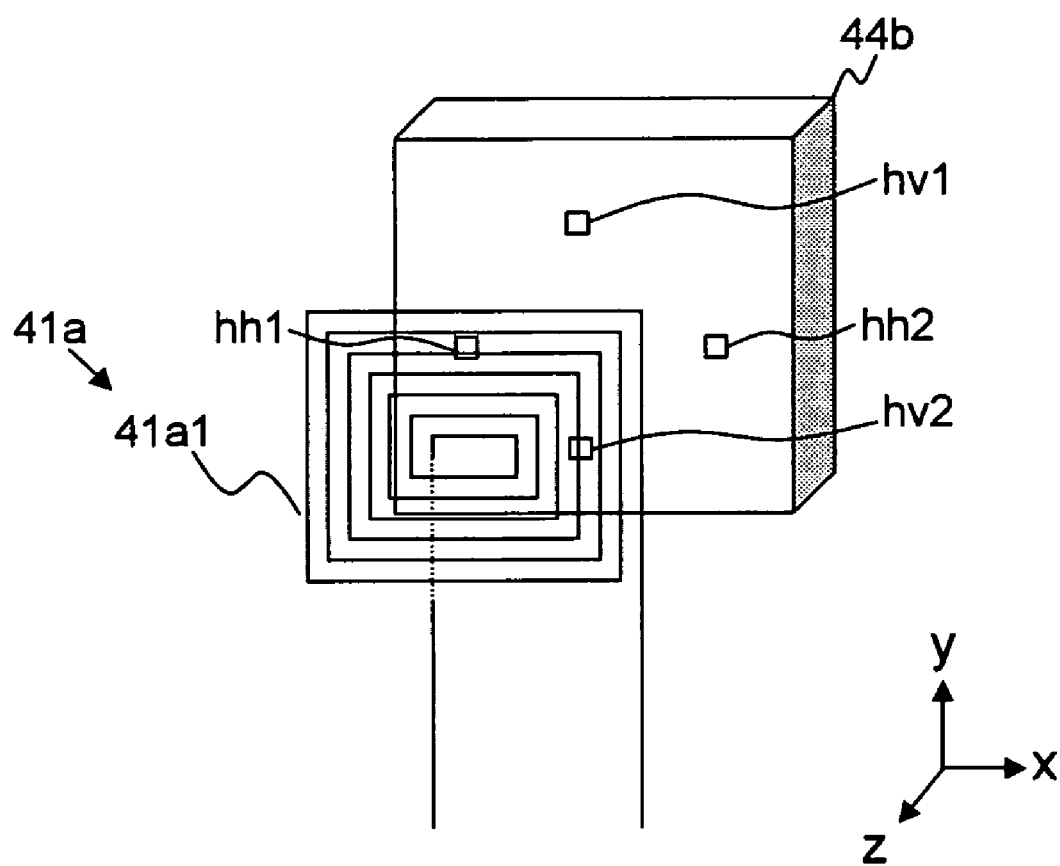
FIG. 16 is a perspective view of the hall element unit and the position-detecting magnetic-field generating unit in the third embodiment.

Next, the third embodiment is explained. In the third embodiment, the position-detecting coil 41a1 forms a seat and a spiral shape coil pattern (see FIG. 16).

The other constructions of the photographing apparatus 1 in the third embodiment are the same as those in the first embodiment.

The thickness of the position-detecting coil 41a1, which is the seat coil in the third embodiment, in the third direction z, is very small. Accordingly, the position-detecting coil 41a1 can be attached to the movable circuit board 49a without greatly increasing thickness, so that the space between the movable circuit board 49a and the hall element unit 44b can be short in comparison with that in the first embodiment. Therefore, the anti-shake unit 30 can be downsized. Further, a plurality of seat coils, which compose the position-detecting coil 41a1, can be layered.

It is explained that the movable unit 30a has the imaging device 39a1. However, the movable unit 30a may have a hand-shake correcting lens instead of the imaging device.

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Further, it is explained that the position-detecting coil 41a1 and the magnetic core 41a2 are the square shaped when viewed from the third direction z. However, the position-detecting coil 41a1 and the magnetic core 41a2 may be a rectangular shape.

Further, in the first, second, and third embodiments, the movable unit 30a is movable in the first direction x and the second direction y, relative to the fixed unit 30b, so that the position-detecting operation is performed by detecting the position of the movable unit in the first direction x (the first location), and in the second direction y (the second location). However, any other methods (or means) for moving the movable unit 30a on a plane which is perpendicular to the third direction z (the optical axis LX), and for detecting the movable unit 30a on the plane, are acceptable.

For example, the movement of the movable unit may only be in one dimension, so that the movable unit can be moved only in the first direction x (not the second direction y). In this case, the parts regarding the movement of the movable unit in the second direction y and regarding the position-detecting operation of the movable unit in the second direction y, such as the vertical hall element hv10 etc., may be omitted (see FIG. 16 etc.).

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-063951 (filed on Mar. 8, 2004), which is expressly incorporated herein by reference, in its entirety.

The invention claimed is:

1. An anti-shake apparatus of a photographing apparatus, comprising:

a movable unit that has one of an imaging device and a hand-shake correcting lens, and that can be moved in first and second directions, said first direction being perpendicular to an optical axis of a camera lens of said photographing apparatus, and said second direction being perpendicular to said optical axis and said first direction;

a fixed unit that slidably supports said movable unit in both said first and second directions, and that has a magnetic-field change-detecting unit;

a signal-processing unit; and a control unit that controls said movable unit, said fixed unit, and said signal-processing unit, and that has first and second A/D converters;

said magnetic-field change-detecting unit having first and second horizontal magnetic-field change-detecting elements for detecting a position of said movable unit in said first direction as a first location, and first and second vertical magnetic-field change-detecting elements for detecting a position of said movable unit in said second direction as a second location;

said movable unit having a position-detecting magnetic-field generating unit which is used for detecting said first and second locations, and which faces said magnetic-field change-detecting unit, and which has a position-detecting coil;

said position-detecting coil being magnetized by being electrified where an N pole and an S pole are arranged in a third direction which is parallel to said optical axis, and said position-detecting coil being wound, such that its outer circumference shape, viewed from said third direction, is a rectangular shape and faces said magnetic-field change-detecting unit, an external structure of said rectangular shape forming lines which are parallel to one of said first direction and said second direction;

said signal-processing unit outputting a first detected-position signal, which specifies said first location on the basis of output signals of said first and second horizontal magnetic-field change-detecting elements, to said first A/D converter, and outputting a second detected-position signal, which specifies said second location on the basis of output signals of said first and second vertical magnetic-field change-detecting elements, to said second A/D converter;

said control unit calculating said first location on the basis of an A/D converting operation by said first A/D converter, for said first detected-position signal, and calculating said second location on the basis of an A/D converting operation by said second A/D converter, for said second detected-position signal;

an optimized coil current-value being calculated in an initial-adjustment operation which adjusts a detecting-resolution when said first and second detected-position signals are A/D converted by said first and second A/D converters, by changing the value of the current which flows through said position-detecting coil; and current having said optimized coil current-value, flowing through said position-detecting coil when detecting the position of said movable unit.

2. The anti-shake apparatus according to claim 1, wherein said optimized coil current-value is the smallest value of first, second, third, and fourth coil current-values;

said first coil current-value is the value of the current which flows through said position-detecting coil, under the condition where the output value of said first detected-position signal is the same as the maximum value in the A/D converting range of said first A/D converter, when said movable unit contacts a first horizontal edge-point which is one of the edge-points of a movement range of said movable unit in said first direction;

said second coil current-value is the value of the current which flows through said position-detecting coil, under the condition where the output value of said first detected-position signal is the same as the minimum value in the A/D converting range of said first A/D converter, when said movable unit contacts a second horizontal edge-point which is another of the edge-points of said movement range of said movable unit in said first direction;

said third coil current-value is the value of the current which flows through said position-detecting coil, under the condition where the output value of said second detected-position signal is the same as the maximum value in the A/D converting range of said second A/D converter, when said movable unit contacts a first vertical edge-point which is one of the edge-points of a movement range of said movable unit in said second direction; and said fourth coil current-value is the value of the current which flows through said position-detecting coil, under the condition where the output value of said second detected-position signal is the same as the minimum value in the A/D converting range of said second A/D converter, when said movable unit contacts a second vertical edge-point which is another of the edge-points of said movement range of said movable unit in said second direction.

3. The anti-shake apparatus according to claim 1, further comprising a memory unit that is connected with said control unit, and stores said optimized coil current-value;

a content which is stored in said memory unit is not deleted even if said memory unit is set to the off state.

4. The anti-shake apparatus according to claim 1, wherein said movable unit is located at the center of its movement range, in both said first and second directions, when the center area of one of said imaging device and said hand-shake correcting lens which is included in said movable unit, is located on said optical axis.

5. The anti-shake apparatus according to claim 4, wherein when the center of one of said imaging device and said hand-shake correcting lens which is included in said movable unit passes through said optical axis, said first horizontal magnetic-field change-detecting element is located at a place which faces midway along a side of said rectangular outer circumference, in said second direction, of said position-detecting coil; said second horizontal magnetic-field change-detecting element is located at a place which faces midway along another side of said rectangular outer circumference, in said second direction, of said position-detecting coil; said first vertical magnetic-field change-detecting element is located at a place which faces midway along a side of said rectangular outer circumference, in said first direction, of said position-detecting coil; and said second vertical magnetic-field change-detecting element is located at a place which faces midway along another side of said rectangular outer circumference, in said first direction, of said position-detecting coil.

6. The anti-shake apparatus according to claim 1, wherein said position-detecting magnetic-field generating unit has a magnetic core;
said position-detecting coil is wound around said magnetic core;
said magnetic core is made of a magnetic material, and has a rectangular prism form; and
said rectangular prism form has a front-surface which faces said magnetic-field change-detecting unit and is a rectangular shape that is the same as said outer circumference of said position-detecting coil.

7. The anti-shake apparatus according to claim 1, wherein said position-detecting coil forms a seat and a spiral shape coil pattern.

8. The anti-shake apparatus according to claim 1, wherein said magnetic-field change-detecting unit is a two-axes hall element;
said first and second horizontal magnetic-field change-detecting elements are hall elements; and
said first and second vertical magnetic-field change-detecting elements are hall elements.

9. The anti-shake apparatus according to claim 1, wherein said outer circumference shape of said position-detecting coil is a square.

10. A method for adjusting a detecting-resolution when A/D converting in an anti-shake apparatus of a photographing apparatus according to claim 1, comprising:
calculating a first coil current-value;
calculating a second coil current-value;
calculating a third coil current-value;
calculating a fourth coil current-value; and
calculating said optimized coil current-value on the basis of said first, second, third, and fourth coil current-values;
said optimized coil current-value being the smallest value of said first, second, third, and fourth coil current-values;
said first coil current-value being the value of the current which flows through said position-detecting coil, under the condition where the output value of said first detected-position signal is the same as the maximum value in the A/D converting range of said first A/D converter, when said movable unit contacts a first horizontal edge-point which is one of the edge-points of a movement range of said movable unit in said first direction;
said second coil current-value being the value of the current which flows through said position-detecting coil, under the condition where the output value of said first detected-position signal is the same as the minimum value in the A/D converting range of said first A/D converter, when said movable unit contacts a second horizontal edge-point which is another of the edge-points of said movement range of said movable unit in said first direction;
said third coil current-value being the value of the current which flows through said position-detecting coil, under the condition where the output value of said second detected-position signal is the same as the maximum value in the A/D converting range of said second A/D converter, when said movable unit contacts a first vertical edge-point which is one of the edge-points of a movement range of said movable unit in said second direction; and
said fourth coil current-value being the value of the current which flows through said position-detecting coil, under the condition where the output value of said second detected-position signal is the same as the minimum value in the A/D converting range of said second A/D converter, when said movable unit contacts second vertical edge-point which is another of the edge-points of said movement range of said movable unit in said second direction.

11. The method according to claim 10, further comprising storing said optimized coil current-value in a memory unit of said photographing apparatus;
a content which is stored in said memory unit is not deleted even if said memory unit is set to the off state.

12. An anti-shake apparatus of a photographing apparatus, comprising:
a movable unit that has one of an imaging device and a hand-shake correcting lens, and that can be moved on a plane which is perpendicular to an optical axis of a camera lens of said photographing apparatus;
a fixed unit that supports said movable unit so as to be movable on said plane, and that has a magnetic-field change-detecting unit for detecting a position of said movable unit on said plane;
a signal-processing unit; and
a control unit that has an A/D converter;
said movable unit having a position-detecting magnetic-field generating unit which is used for detecting said position, and which faces said magnetic-field change-detecting unit, and which has a position-detecting coil;
said position-detecting coil being magnetized by being electrified where an N pole and an S pole are arranged in a direction which is parallel to said optical axis;
said signal-processing unit outputting a detected-position signal, which specifies said position on the basis of an output signal of said magnetic-field change-detecting unit, to said A/D converter;
said control unit calculating said position on the basis of an A/D converting operation by said A/D converter, for said detected-position signal;
an optimized coil current-value being calculated in an initial-adjustment operation which adjusts a detecting-resolution when said detected-position signal is A/D converted by said A/D converter, by changing the value of the current which flows through said position-detecting coil; and
current having said optimized coil current-value, flowing through said position-detecting coil when detecting said position.

13. A method for adjusting a detecting-resolution when A/D converting in an anti-shake apparatus of a photographing apparatus according to claim 12, comprising:
calculating a first coil current-value;
calculating a second coil current-value; and
calculating said optimized coil current-value on the basis of said first and second coil current-values;

said optimized coil current-value being the smaller value of said first and second coil current-values;

said first coil current-value being the value of the current which flows through said position-detecting coil, under the condition where the output value of said detected-position signal is the same as the maximum value in the A/D converting range of said A/D converter, when said movable unit contacts a first edge-point which is one of the edge-points of a movement range of said movable unit; and said second coil current-value being the value of the current which flows through said position-detecting coil, under the condition where the output value of said detected-position signal is the same as the minimum value in the A/D converting range of said A/D converter, when said movable unit contacts a second edge-point which is another of the edge-points of said movement range of said movable unit.

* * * * *